(12) United States Patent
Saitoh et al.

(10) Patent No.: US 12,449,652 B2
(45) Date of Patent: Oct. 21, 2025

(54) LIGHT DEFLECTION DEVICE AND OPTICAL DEVICE

(71) Applicant: FUJIFILM Corporation, Tokyo (JP)

(72) Inventors: Yukito Saitoh, Minamiashigara (JP); Hiroshi Sato, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 750 days.

(21) Appl. No.: 17/681,183

(22) Filed: Feb. 25, 2022

(65) Prior Publication Data
US 2022/0179194 A1 Jun. 9, 2022

Related U.S. Application Data
(63) Continuation of application No. PCT/JP2020/032865, filed on Aug. 31, 2020.

(30) Foreign Application Priority Data
Aug. 29, 2019 (JP) .................................. 2019-156855

(51) Int. Cl.
*G02B 26/08* (2006.01)
*G02B 5/18* (2006.01)
*G02B 26/10* (2006.01)

(52) U.S. Cl.
CPC .......... *G02B 26/0833* (2013.01); *G02B 5/18* (2013.01); *G02B 26/10* (2013.01)

(58) Field of Classification Search
None
See application file for complete search history.

(56) References Cited

U.S. PATENT DOCUMENTS
| | | |
|---|---|---|
| 7,969,558 B2 | 6/2011 | Hall |
| 2017/0059710 A1 | 3/2017 | Delfs et al. |
| | (Continued) | |

FOREIGN PATENT DOCUMENTS
| | | |
|---|---|---|
| JP | 2016-65964 A | 4/2016 |
| JP | 2017-520756 A | 7/2017 |
| | (Continued) | |

OTHER PUBLICATIONS
International Preliminary Report on Patentability and Written Opinion of the International Searching Authority (Forms PCT/IB/326, PCT/IB/373, and PCT/ISA/237) for International Application No. PCT/JP2020/032865, dated Mar. 10, 2022, with an English translation.

(Continued)

*Primary Examiner* — Jyotsna V Dabbi
(74) *Attorney, Agent, or Firm* — Birch, Stewart, Kolasch & Birch, LLP

(57) ABSTRACT

A light deflection device having a simple structure suitable for reducing the size and weight where a deflection angle can be increased, and an optical device including the light deflection device. The light deflection device includes: a MEMS light deflection element that deflects incident light to be emitted; and an angle increasing optical element that is disposed downstream of the light deflection element in a light traveling direction and increases an angle range of a deflection angle of light emitted from the light deflection element, in which the MEMS light deflection element has a function of collecting and emitting incident light.

13 Claims, 8 Drawing Sheets

(56) References Cited

U.S. PATENT DOCUMENTS

| | | | |
|---|---|---|---|
| 2017/0184707 A1 | 6/2017 | Sugiura et al. | |
| 2018/0172994 A1* | 6/2018 | Robbins | G02B 27/4261 |
| 2019/0107711 A1* | 4/2019 | Blanche | G02B 26/0808 |
| 2020/0271839 A1 | 8/2020 | Saitoh et al. | |
| 2020/0348528 A1* | 11/2020 | Jamali | G02B 27/0172 |

FOREIGN PATENT DOCUMENTS

| | | |
|---|---|---|
| WO | WO 2009/140077 A2 | 11/2009 |
| WO | WO 2019/093228 A1 | 5/2019 |

OTHER PUBLICATIONS

International Search Report (Form PCT/ISA/210) for International Application No. PCT/JP2020/032865, dated Nov. 24, 2020, with an English translation.

* cited by examiner

LIGHT DEFLECTION DEVICE AND OPTICAL DEVICE

CROSS-REFERENCE TO RELATED APPLICATIONS

This application is a Continuation of PCT International Application No. PCT/JP2020/032865 filed on Aug. 31, 2020, which claims priority under 35 U.S.C. § 119(a) to Japanese Patent Application No. 2019-156855 filed on Aug. 29, 2019. The above application is hereby expressly incorporated by reference, in its entirety, into the present application.

BACKGROUND OF THE INVENTION

1. Field of the Invention

The present invention relates to a light deflection device having a simple structure suitable for reducing the size and weight where a deflection angle can be increased, and an optical device including the light deflection device.

2. Description of the Related Art

Currently, a laser light deflection technique is applied to various fields. Examples of the light deflection technique include an aberration correction system for free-space optical communication and a scanning system for laser radar.

In the related art, as a laser light deflector or a pointing optical system, for example, a gimbal mirror or a galvanometer mirror has been widely used. These methods are direct and simple methods because the mirror is mechanically moved to control a direction of laser light.

In addition, regarding the light deflector, a configuration described in U.S. Pat. No. 7,969,558B in which a light source and an optical receiver are provided in a rotary stage to rotate the entire optical system is also known.

SUMMARY OF THE INVENTION

However, in the method of the related art, it is necessary to control a relatively large mirror or a rotary stage along with a large physical operation. Therefore, there is a problem in that the method is not suitable for a system requiring a reduction in size and weight or for a use requiring low power consumption.

An object of the present invention is to solve the problems of the related art and to provide: a light deflection device having a simple structure suitable for reducing the size and weight where a deflection angle can be increased, and an optical device including the light deflection device.

In order to achieve the object, a light deflection device according to the present invention has the following configurations.

[1] A light deflection device comprising:
  a MEMS light deflection element that deflects incident light to be emitted; and
  an angle increasing optical element that is disposed downstream of the light deflection element in a light traveling direction and increases an angle range of a deflection angle of light emitted from the light deflection element,
in which the MEMS light deflection element has a function of collecting and emitting incident light.

[2] The light deflection device according to [1],
in which the MEMS light deflection element includes a diffraction element having different periodic structure pitches in a plane.

[3] The light deflection device according to [2],
in which the diffraction element in the MEMS light deflection element is a diffraction element in which the periodic structure pitch gradually changes from an inner side toward an outer side in a light deflection direction of the MEMS light deflection element.

[4] The light deflection device according to [2] or [3],
in which the diffraction element in the MEMS light deflection element is a liquid crystal diffraction element.

[5] The light deflection device according to [4],
in which the liquid crystal diffraction element includes a cholesteric liquid crystal layer,
the cholesteric liquid crystal layer has a liquid crystal alignment pattern in which a direction of an optical axis derived from a liquid crystal compound changes while continuously rotating in at least one direction, and
in a case where, in the liquid crystal alignment pattern, a length over which the direction of the optical axis derived from the liquid crystal compound rotates by 180° in the one direction in which the direction of the optical axis derived from the liquid crystal compound changes while continuously rotating is set as a single period, a length of the single period gradually decreases from an inner side toward an outer side.

[6] The light deflection device according to [5],
in which the cholesteric liquid crystal layer has a liquid crystal alignment pattern in a radial shape from an inner side toward an outer side, the liquid crystal alignment pattern being a pattern in which the direction of the optical axis derived from the liquid crystal compound changes while continuously rotating in the one direction.

[7] The light deflection device according to any one of [1] to [6],
in which the angle increasing optical element includes a diffraction element having different periodic structure pitches in a plane.

[8] The light deflection device according to [7],
in which the diffraction element in the angle increasing optical element is a diffraction element in which the periodic structure pitch gradually changes from an inner side toward an outer side in a light deflection direction of the MEMS light deflection element.

[9] The light deflection device according to [7] or [8],
in which the diffraction element in the angle increasing optical element is a liquid crystal diffraction element.

[10] The light deflection device according to [9],
in which the liquid crystal diffraction element includes an optically-anisotropic layer formed of a composition including a liquid crystal compound,
the optically-anisotropic layer has a liquid crystal alignment pattern in which a direction of an optical axis derived from the liquid crystal compound changes while continuously rotating in at least one direction, and
in a case where, in the liquid crystal alignment pattern, a length over which the direction of the optical axis derived from the liquid crystal compound rotates by 180° in the one direction in which the direction of the optical axis derived from the liquid crystal compound changes while continuously rotating is set as a single period, a length of the single period gradually decreases from an inner side toward an outer side.

[11] The light deflection device according to [10], in which the optically-anisotropic layer has a liquid crystal alignment pattern in a radial shape from an inner side toward an outer side, the liquid crystal alignment pattern being a pattern in which the direction of the optical axis derived from the liquid crystal compound changes while continuously rotating in the one direction.

[12] An optical device comprising:
the light deflection device according to any one of [1] to [11];
a light source that emits light to the light deflection element of the light deflection device; and
a light-receiving element.

According to an aspect of the present invention, it is possible to provide a light deflection device having a simple structure suitable for reducing the size and weight where a deflection angle can be increased, and an optical device including the light deflection device.

DESCRIPTION OF THE PREFERRED EMBODIMENTS

Hereinafter, a light deflection device according to an embodiment of the present invention will be described with reference to the drawings.

In each of the drawings, for easy visual recognition, the reduced scale of components is different from the actual scale.

In the present specification, numerical ranges represented by "to" include numerical values before and after "to" as lower limit values and upper limit values.

In addition, "perpendicular" or "parallel" regarding an angle represents a range of the exact angle±10°.

In the present specification, Re($\lambda$) represents an in-plane retardation at a wavelength $\lambda$. Unless specified otherwise, the wavelength $\lambda$ refers to 550 nm.

In the present specification, Re($\lambda$) is a value measured at the wavelength $\lambda$ using AxoScan (manufactured by Axometrics, Inc.). By inputting an average refractive index ((nx+ny+nz)/3) and a film thickness (d (μm)) to AxoScan, the following expressions can be calculated.

Slow Axis Direction (°)

$$Re(\lambda)=R0(\lambda)$$

R0($\lambda$) is expressed as a numerical value calculated by AxoScan and represents Re($\lambda$).

A configuration of the light deflection device according to the embodiment of the present invention will be described using conceptual diagrams of FIG. 1.

Figure 1:
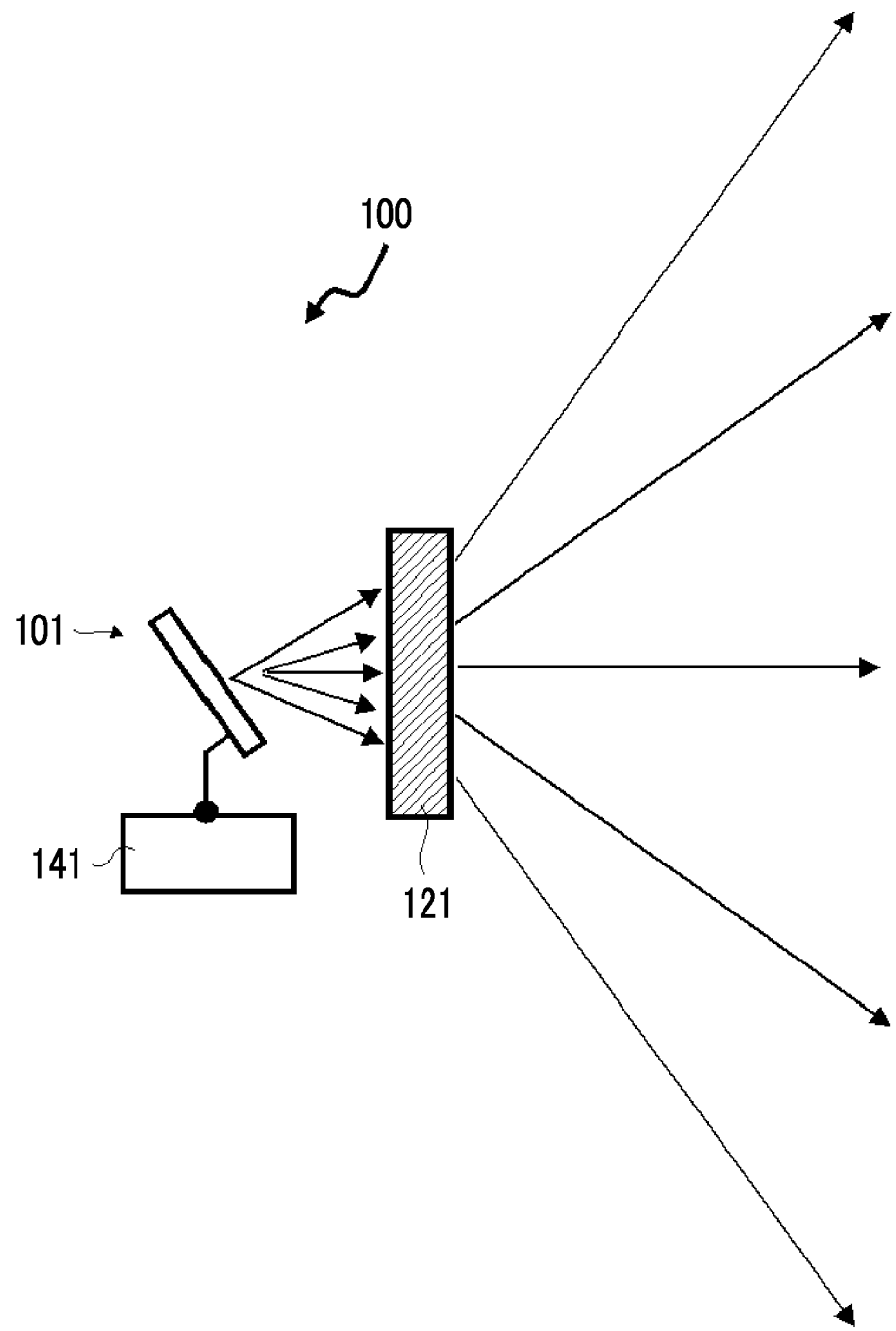
FIG. 1 is a conceptual diagram showing an example of a light deflection device according to the present invention.

A light deflection device 100 shown in FIG. 1 includes a MEMS light deflection element 101, a liquid crystal diffraction element 121, and a drive unit 141. In the light deflection device 100 shown in FIG. 1, the liquid crystal diffraction element 121 is a transmissive liquid crystal diffraction element and is an angle increasing optical element according to the embodiment of the present invention.

In the light deflection device 100 according to the embodiment of the present invention, the MEMS light deflection element 101 deflects incident light and has a function of collecting and emitting incident light.

As shown in FIG. 1, in the light deflection device 100 according to the embodiment of the present invention, a direction of light emitted from a light source on an upstream side in a traveling direction of light (light beam) is deflected by a reflection plate of the MEMS light deflection element 101. Concurrently, the reflected light is collected by a light collecting function imparted to the reflection plate of the MEMS light deflection element 101.

Regarding the light that is deflected and collected by the MEMS light deflection element 101, a deflection angle is increased by the transmissive liquid crystal diffraction element 121 as the angle increasing optical element, and the collected light is converted into straight light. As a result, the straight light is emitted from the light deflection device 100 at a desired maximum emission angle θmaxout that is mom than a maximum deflection angle θmax of the MEMS light deflection element 101.

In the light deflection device 100 according to the embodiment of the present invention, as the MEMS light deflection element 101, a light deflection element that is the same as a well-known micro electro mechanical systems (MEMS) light deflection element except that it has a function of collecting and emitting incident light can be used.

That is, in the light deflection device 100 according to the embodiment of the present invention, the MEMS light deflection element 101 is basically the same as a well-known MEMS light deflection element except that the reflection plate (reflective member) has a function of collecting and reflecting incident light.

Accordingly, the basic configuration of the MEMS light deflection element is not particularly limited, and all of the well-known MEMS light deflection elements (for example, a MEMS scanner (light scanner), a MEMS light deflector, a MEMS mirror, or a digital micromirror device (DMD)) that swing a mirror using a piezoelectric actuator to deflect light (deflection scanning), for example, a MEMS light deflection element described in JP2012-208352A, a MEMS light deflection element described in JP2014-134642A, or a MEMS light deflection element described in JP2015-22064A can be used.

In FIG. 1, reference numeral 141 represents a drive unit that drives the MEMS light deflection element 101 and controls driving. As the drive unit 141, a well-known drive unit corresponding to the configuration of the MEMS light deflection element 101, for example, a drive mechanism (oscillation mechanism) of the reflection plate in the MEMS light deflection element 101 may be used.

In addition, a light collecting function is imparted to the reflection plate of the MEMS light deflection element. That is, in the light deflection device 100 according to the embodiment of the present invention, the MEMS light deflection element 101 has two functions of deflection and light collection.

The light reflected from the MEMS light deflection element 101 is collected while being deflected, reaches the liquid crystal diffraction element 121 that is the angle increasing optical element, and is converted into straight light while the deflection angle is increasing by the liquid crystal diffraction element 121. As a result, the straight light is emitted from the light deflection device 100 at a desired maximum emission angle θmaxout that is more than a maximum deflection angle θmax of the MEMS light deflection element 101. Although described below, in the light deflection device 100 according to the embodiment of the present invention, by imparting the light collecting function to the reflection plate of the MEMS light deflection element 101, an increase in emission angle and emission of straight light can be achieved simultaneously even in a case where an element having a simple structure that is suitable for a reduction in size and weight is used as the liquid crystal diffraction element 121 (angle increasing optical element).

As described above, the reflection plate in the MEMS light deflection element 101 has a function of collecting reflected light. The reflection plate of the MEMS light deflection element having the above-described function can be achieved, for example, by using a diffraction element as the reflection plate.

In the diffraction element used as the reflection plate of the MEMS light deflection element 101, it is preferable that a periodic structure pitch gradually changes from a center (center of the polarization angle) toward an outer side of the reflection plate such that the diffraction angle of reflected light increases from a center toward an outer side of the reflection plate. That is, it is preferable that the pitch (period) of the periodic structure in the diffraction element gradually changes from an inner side toward an outer side in a polarization direction such that the diffraction angle increases from the inner side (center) toward the outer side in the polarization direction. Specifically, it is preferable that the pitch of the periodic structure gradually decreases from the inner side toward the outer side in the polarization direction.

The diffraction element used in the MEMS light deflection element 101 is not particularly limited, and various well-known diffraction elements can be used. In particular, from the viewpoint of improving the diffraction efficiency and reducing the thickness of the reflection plate, a reflective liquid crystal diffraction element can be suitably used.

As a representative liquid crystal diffraction element, a reflective liquid crystal diffraction element that includes a cholesteric liquid crystal layer having a liquid crystal alignment pattern in which a direction of an optical axis derived from a liquid crystal compound changes while continuously rotating in at least one in-plane direction can be preferably used. This reflective liquid crystal diffraction element will be described below.

As described above, in the light deflection device 100 according to the embodiment of the present invention, as the diffraction element that imparts the function of collecting and emitting incident light to the MEMS light deflection element 101 (reflection plate), various well-known diffraction elements that exhibit the above-described function can be used.

Examples of the diffraction element used as the reflection plate include a surface relief diffraction element that diffracts light with a fine uneven portion formed on the surface. In the surface relief diffraction element, for example, it is preferable that an uneven grating period (relief pattern) gradually changes from the inner side (center of deflection) toward the outer side in the polarization direction such that the diffraction angle gradually increases from an inner side toward an outer side in a deflection direction of the MEMS light deflection element 101.

The surface relief diffraction element is not particularly limited as long as the above-described requirements are satisfied. For example, all of the well-known surface relief diffraction elements (surface relief diffraction gratings) such as a structure described in JP2015-93439A can be used.

In addition, another preferable examples of the diffraction element used as the reflection plate include a hologram diffraction element that exposes a photosensitive material or the like to a pattern shape by holography and diffracts light according to a difference in the refractive index of the exposed portion. It is preferable that the hologram diffraction element has a periodic refractive index distribution that gradually changes from the inner side (center of deflection) toward the outer side in the polarization direction such that, for example, the diffraction angle gradually increases from the inner side toward the outer side in the deflection direction of the MEMS light deflection element 101.

The hologram diffraction element is not particularly limited as long as the above-described requirements are satisfied. For example, all of the well-known hologram diffraction elements (holographic diffraction elements (diffraction gratings)) such as a hologram sheet described in JP2016-184124A can be used.

In addition, another preferable examples of the diffraction element used as the reflection plate include photonic crystal.

For example, as in a method described in JP2017-111277A, a transparent substrate that is formed of an inorganic material and a plurality of uneven pattern forming portions that are formed of a plurality of protrusions formed of Si or the like are provided at a regular interval such that structural birefringence occurs and the azimuthal angle is changed in a plane. As a result, the photonic crystal can obtain the effect of diffraction.

In addition, in the MEMS light deflection element 101, a reflection plate having a curved reflecting surface, for example, a concave mirror can also be used without using the above-described diffraction element as the reflection plate. As a result, the same light collecting function can be imparted to the MEMS light deflection element 101.

The angle increasing optical element can increase the deflection angle (angle range of the polarization angle) of light deflected by the MEMS light deflection element 101.

As the angle increasing optical element, various well-known elements having a function of increasing the emission angle of light can be used in addition to the transmissive liquid crystal diffraction element 121 in the example shown in the drawing. In particular, the diffraction element as the element having a simple structure that is suitable for a reduction in size and weight is suitably used as the angle increasing optical element.

As the diffraction element as the angle increasing optical element, a liquid crystal diffraction element can be preferably used as in the reflection plate of the MEMS light deflection element. As described above, in the light deflection device 100 in the example shown in the drawing, in a preferable aspect, the transmissive liquid crystal diffraction element 121 is used as the angle increasing optical element.

As the angle increasing optical element, the photonic crystal, the hologram diffraction element, the surface relief diffraction element, and the like can also be used as in the reflection plate of the MEMS light deflection element.

In addition, in addition to the above-described diffraction element, as the angle increasing optical element using refraction of light, a simple optical lens, for example, a concave lens formed of glass or a concave lens formed of a resin can also be used. As a result, the same function of increasing the polarization angle can be imparted.

Hereinafter, the components will be described in detail.

In the following description, the MEMS light deflection element 101 will also be simply referred to as "light deflection element 101".

[Transmissive Liquid Crystal Diffraction Element as Angle Increasing Optical Element]

Figure 2:
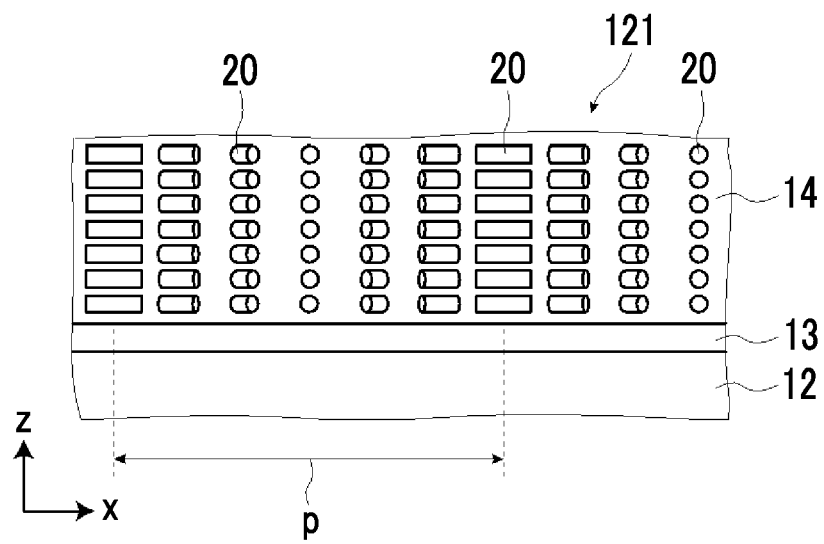
FIG. 2 is a conceptual diagram showing an example of a transmissive liquid crystal diffraction element.

FIG. 2 conceptually shows the liquid crystal diffraction element 121 as an example of the angle increasing optical element consisting of the diffraction element. FIG. 2 is a diagram showing the liquid crystal diffraction element 121 in case of being in the same direction as that of FIG. 1, and is a side view showing the liquid crystal diffraction element 121.

The liquid crystal diffraction element 121 has a sheet shape and includes a support 12, an alignment film 13, and an optically-anisotropic layer 14.

In the present invention, a layer configuration of the liquid crystal diffraction element 121 is not limited to this example. That is, the liquid crystal diffraction element may be configured to include the alignment film 13 and the optically-anisotropic layer 14 by peeling off the support 12 from the liquid crystal diffraction element 121 shown in FIG. 2, may be configured to include only the optically-anisotropic layer 14 by peeling off the support 12 and the alignment film 13 from the liquid crystal diffraction element 121 shown in FIG. 2, or may be a laminate in which a sheet-shaped material such as another base material adheres to the optically-anisotropic layer 14.

That is, the transmissive liquid crystal diffraction element that is used in the present invention and includes the optically-anisotropic layer can adopt various layer configurations as long as it includes an optically-anisotropic layer having a liquid crystal alignment pattern in which a direction of an optical axis derived from a liquid crystal compound changes while continuously rotating in at least one in-plane direction.

Regarding this point, the same can also be applied to the reflective liquid crystal diffraction element described below.

As described above, the liquid crystal diffraction element 121 as the angle increasing optical element diffracts light deflected by the light deflection element 101 in a deflection direction from the light deflection element such that the light deflected by the light deflection element 101 is further deflected. In the light deflection device 100, by using the light deflection element 101 in combination with the liquid crystal diffraction element 121 (angle increasing optical element), light can be deflected at a deflection angle of the maximum emission angle θmaxout that is significantly more than the maximum deflection angle θmax of the light deflection element 101.

In the example shown in the drawing, a sheet surface direction of the liquid crystal diffraction element 121 is defined as "x-y direction", and a thickness direction is defined as "z direction". In FIG. 2, a horizontal direction is a direction (axis A direction described below) in which an optical axis derived from a liquid crystal compound rotates in one direction, and this direction is a x direction. Accordingly, a y direction is a direction perpendicular to the paper plane of FIG. 2.

In addition, in FIG. 1, the up-down direction corresponds to the x direction, a direction perpendicular to the paper plane corresponds to the y direction, and the horizontal direction corresponds to the z direction. In a case where the deflection direction of light of the light deflection element 101 is one-dimensional, the x direction (axis A described below) matches the deflection direction of the light deflection element 101.

In FIG. 1, the liquid crystal diffraction element 121 is planar. However, the liquid crystal diffraction element 121 may be curved without being limited to being planar.

<Support>

As the support 12, various sheet-shaped materials (films or plate-shaped materials) can be used as long as they can support the alignment film 13 and the optically-anisotropic layer 14.

As the support 12, a transparent support is preferable, and examples thereof include a polyacrylic resin film such as polymethyl methacrylate, a cellulose resin film such as cellulose triacetate, and a cycloolefin polymer film. Examples of the cycloolefin polymer film include trade name "ARTON", manufactured by JSR Corporation and trade name "ZEONOR", manufactured by Zeon Corporation).

The support 12 may be a flexible film or may be a non-flexible substrate such as a glass substrate.

<Alignment Film> in the liquid crystal diffraction element 121, the alignment film 13 is formed on a surface of the support 12.

The alignment film 13 is an alignment film for aligning a liquid crystal compound 20 to a predetermined liquid crystal alignment pattern during the formation of the optically-anisotropic layer 14.

Although described below, in the liquid crystal diffraction element 121, the optically-anisotropic layer 14 has a liquid crystal alignment pattern in which a direction of an optical axis 22 derived from the liquid crystal compound 20 changes while continuously rotating in one in-plane direction (x direction in FIG. 2). Accordingly, the alignment film 13 of the liquid crystal diffraction element 121 is formed such that the optically-anisotropic layer 14 can form the liquid crystal alignment pattern.

In the optically-anisotropic layer 14 of the liquid crystal diffraction element 121, in the liquid crystal alignment pattern, a length over which the direction of the optical axis 22 rotates by 180° in the one in-plane direction (the direction along the axis A described below) in which the direction of the optical axis 22 changes while continuously rotating is set as a single period Λ (the rotation period p of the optical axis 22). In the optically-anisotropic layer 14 of the light deflection device 100, the single period gradually decreases from the inner side (center) toward the outer side in the deflection direction (deflection orientation) of the light deflection element 101.

In addition, the rotation direction of the optical axis of the liquid crystal compound 20 is reversed in the direction along the axis A (arrow x direction) at the center in the deflection direction of the light deflection element 101.

Accordingly, the alignment film 13 of the liquid crystal diffraction element 121 is formed such that the optically-anisotropic layer 14 can form the liquid crystal alignment pattern.

As the alignment film 13, various well-known films can be used.

Examples of the alignment film 13 of the optically-anisotropic layer 14 include a rubbed film formed of an organic compound such as a polymer, an obliquely deposited film formed of an inorganic compound, a film having a microgroove, and a film formed by lamination of Langmuir-Blodgett (LB) films formed with the Langmuir-Blodgett technique using an organic compound such as w-tricosanoic acid, dioctadecylmethylammonium chloride, or methyl stearate.

Examples of the alignment film 13 include a film obtained by rubbing a surface of a polymer layer. The rubbing treatment is performed by rubbing a surface of a polymer layer with paper or fabric in a given direction multiple times. As the kind of the polymer used for the alignment film, for example, polyimide, polyvinyl alcohol, a polymer having a polymerizable group described in JP1997-152509A (JP-H9-152509A), or an alignment film such as alignment films described in JP2005-97377A, JP2005-99228A, and JP2005-128503A can be preferably used.

The vertical alignment film described in the present invention refers to an alignment film in which a major axis of a molecule of the polymerizable rod-like liquid crystal compound according to the present invention is aligned to be substantially perpendicular to a rubbing direction of the vertical alignment film. The thickness of the alignment film is not necessarily large as long as it can provide the alignment function, and is preferably 0.01 to 5 µm and more preferably 0.05 to 2 µm.

As the alignment film 13, a so-called photo-alignment film obtained by irradiating a photo-alignable material with polarized light or non-polarized light can also be used. That is, the photo-alignment film may be prepared by applying the photo-alignable material to the support 12.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, polyamide, or ester described in JP2003-520878A, JP2004-529220A., and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A. Among these, an azo compound, a photocrosslinking polyimide, polyamide, ester, a cinnamate compound, or a chalcone compound is more preferable.

In the present invention, the photo-alignment film is preferably used.

Figure 6:
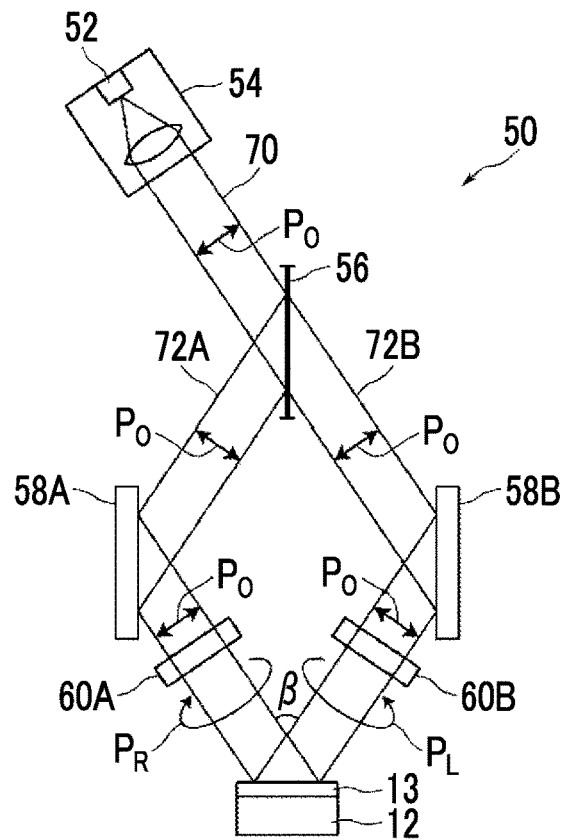
FIG. 6 is a conceptual diagram showing an example of an exposure device of an alignment film.

FIG. 6 is a schematic diagram showing an exposure device for an alignment film, in which the photo-alignment material is applied to the support 12 and dried to form the alignment film 13 and the alignment film 13 is exposed to form an alignment pattern.

Figure 3:
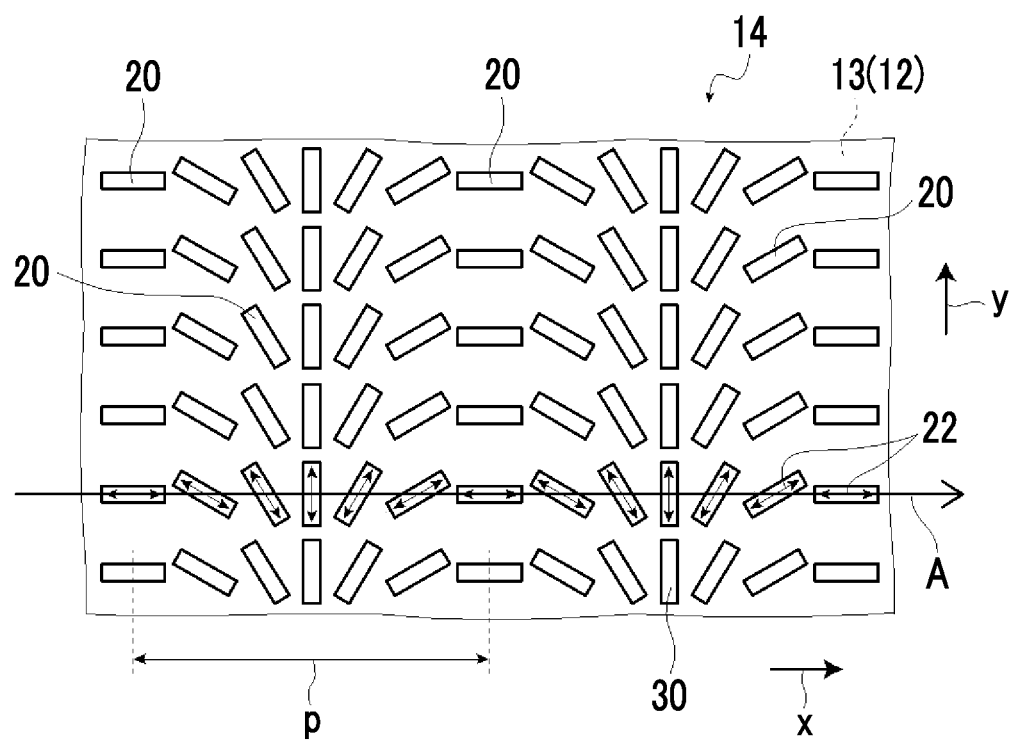
FIG. 3 is a conceptual diagram showing an action of the liquid crystal diffraction element shown in FIG. 2.

An exposure device 50 is an exposure device of the alignment film 13 for forming the alignment pattern (liquid crystal alignment pattern) in which the optical axis 22 of the liquid crystal compound 20 changes while rotating only in the one in-plane direction (axis A direction (x direction)), for example, as shown in FIG. 3 described below. This exposure device 50 is mainly used for exposure of the alignment film 13 of the liquid crystal diffraction element 121 used in a case where the deflection direction of light of the light deflection element 101 of the light deflection device 100 is one-dimensional.

The exposure device 50 includes: a light source 54 including a laser 52; a polarization beam splitter 56 that splits laser light 70 emitted from the laser 52 into two beams 72A and 72B; and mirrors 58A and 58B that are disposed on optical paths of the splitted two beams 72A and 72B, respectively; and λ/4 plates 60A and 60B.

The light source 54 emits linearly polarized light $P_0$. The λ/4 plate 60A converts the linearly polarized light $P_0$ into right circularly polarized light $P_R$, and the λ/4 plate 60B converts the linearly polarized light $P_0$ into left circularly polarized light $P_L$.

The support 12 including the alignment film 13 on which the alignment pattern is not yet formed is disposed at an exposed portion, the two beams 72A and 72B intersect and interfere with each other on the alignment film 13, and the alignment film 13 is irradiated with and exposed to the interference light. Due to the interference at this time, the polarization state of light with which the alignment film 13 is irradiated periodically changes according to interference fringes. As a result, an alignment pattern in which the alignment state periodically changes can be obtained.

In the exposure device 50, by changing an intersecting angle β between the two beams 72A and 72B, the period of the alignment pattern can be changed. That is, by adjusting the intersecting angle β in the exposure device 50, in the alignment pattern in which the optical axis 22 derived from the liquid crystal compound 20 continuously rotates in the one in-plane direction, the length of the single period (rotation period p=period p) over which the optical axis 22 rotates by 180° in the one in-plane direction in which the optical axis 22 rotates can be adjusted.

By forming the optically-anisotropic layer 14 described below on the alignment film 13 having the alignment pattern in which the alignment state periodically changes, the optically-anisotropic layer 14 having the liquid crystal alignment pattern corresponding to the period can be formed.

In addition, by rotating the optical axes of the λ/4 plates 60A and 60B by 90°, respectively, the rotation direction of the optical axis 22 can be reversed.

Figure 7:
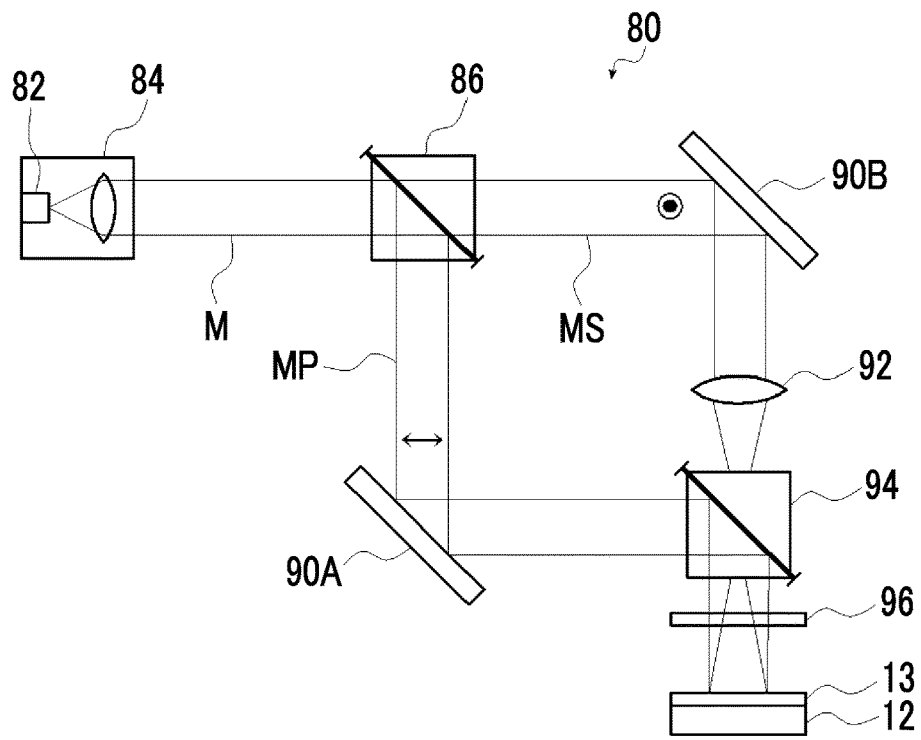
FIG. 7 is a conceptual diagram showing another example of the exposure device of the alignment film.

In addition, in order to expose the alignment film 13 that forms the liquid crystal diffraction element 121 as the angle increasing optical element according to the embodiment of the present invention, an exposure device 80 conceptually shown in FIG. 7 is also suitably used.

The exposure device 80 shown in FIG. 7 is an exposure device of the alignment film 13 for forming the alignment pattern (liquid crystal alignment pattern) in which the optical axis 22 of the liquid crystal compound 20 changes while rotating in a concentric circular shape (radial shape) as conceptually shown in FIG. 5 described below. This exposure device 80 is mainly used for exposure of the alignment film 13 of the liquid crystal diffraction element 121 used in a case where the deflection direction of light of the light deflection element 101 of the light deflection device 100 is radial (two-dimensional).

The exposure device 80 shown in FIG. 7 includes: a light source 84 that includes a laser 82; a polarization beam splitter 86 that splits the laser light M emitted from the laser 82 into S polarized light MS and P polarized light MP; a mirror 90A that is disposed on an optical path of the P polarized light MP; a mirror 90B that is disposed on an optical path of the S polarized light MS; a lens 92 (convex lens) that is disposed on the optical path of the S polarized light MS; a polarization beam splitter 94; and a λ/4 plate 96.

The P polarized light MP that is split by the polarization beam splitter 86 is reflected from the mirror 90A to be incident into the polarization beam splitter 94. On the other hand, the S polarized light MS that is split by the polarization beam splitter 86 is reflected from the mirror 90B and is collected by the lens 92 to be incident into the polarization beam splitter 94.

The P polarized light MP and the S polarized light MS are multiplexed by the polarization beam splitter 94, are converted into right circularly polarized light and left circularly polarized light by the λ/4 plate 96 depending on the polarization direction, and are incident into the alignment film 13 on the support 12.

Due to interference between the right circularly polarized light and the left circularly polarized light, the polarization state of light with which the alignment film 13 is irradiated periodically changes according to interference fringes. The intersecting angle between the right circularly polarized light and the left circularly polarized light changes from the inner side to the outer side of the concentric circle. Therefore, an exposure pattern in which the pitch changes from the inner side to the outer side can be obtained. As a result, in the alignment film 13, a concentric circular alignment pattern in which the alignment state periodically changes can be obtained.

In the exposure device 80, the length of the single period (rotation period p) over which the optical axis 22 of the liquid crystal compound 20 continuously rotates by 180° in the one in-plane direction can be controlled by changing the refractive power of the lens 92 (the F number of the lens 92), the focal length of the lens 92, the distance between the lens 92 and the alignment film 13, and the like.

In addition, by adjusting the refractive power of the lens 92 (the F number of the lens 92), the length of the single period over which the optical axis 22 rotates by 180° in the one in-plane direction in which the optical axis 22 continuously rotates can be changed. Specifically, the length of the single period over which the optical axis 22 rotates by 180° can be changed depending on the degree to which light transmitted through the lens 92 is collected for interference with parallel light. More specifically, in a case where the refractive power of the lens 92 is weak, light is approximated to parallel light. Therefore, the length of the single period over which the optical axis 22 rotates by 180° gradually decreases from the inner side toward the outer side, and the F number increases. Conversely, in a case where the refractive power of the lens 92 becomes stronger, the length of the single period over which the optical axis 22 rotates by 180° rapidly decreases from the inner side toward the outer side, and the F number decreases.

This way, the configuration of changing the length of the single period (rotation period p) over which the optical axis 22 rotates by 180° in the one in-plane direction in which the optical axis 22 continuously rotates can also be used in the configuration shown in FIG. 3 in which the optical axis 22 of the liquid crystal compound 20 continuously changes while rotating only in the one in-plane direction as the arrow x direction (axis A direction).

Further, depending on the uses of the optical element such as a case where it is desired to provide a light amount distribution in transmitted light, a configuration in which regions having partially different single periods over which the optical axis 22 rotates by 180° in the arrow x direction are provided can also be used instead of the configuration in which the length of the single period over which the optical axis 22 rotates by 180° gradually changes in the arrow x direction. For example, as a method of partially changing the single period over which the optical axis 22 rotates by 180°, for example, a method of scanning and exposing the photo-alignment film to be patterned while freely changing a polarization direction of laser light to be collected can be used.

In the liquid crystal diffraction element 121, the alignment film 13 is provided as a preferable aspect and is not an essential configuration requirement.

For example, the following configuration can also be adopted, in which, by forming the alignment pattern on the support 12 using a method of rubbing the support 12, a method of processing the support 12 with laser light or the like, or the like, the optically-anisotropic layer 14 has the liquid crystal alignment pattern in which the direction of the optical axis 22 derived from the liquid crystal compound 20 changes while continuously rotating in at least one in-plane direction.

<Optically-Anisotropic Layer>

In the liquid crystal diffraction element 121, the optically-anisotropic layer 14 that is a cured layer of the liquid crystal composition including the liquid crystal compound 20 is provided on a surface of the alignment film 13.

The optically-anisotropic layer 14 has a liquid crystal alignment pattern in which the optical axis 22 (slow axis) of the liquid crystal compound 20 is arranged in at least one in-plane direction and in which the direction of the optical axis 22 of the liquid crystal compound 20 changes while rotating in the one in-plane direction.

In the liquid crystal diffraction element 121 according to the embodiment, a retardation R (=Δn·d1) of the optically-anisotropic layer 14 in the thickness direction (in the drawing, the z direction) with respect to light having the wavelength λ is 0.36λ to 0.64λ. The retardation R is preferably 0.4λ to 0.6λ, more preferably 0.45λ to 0.55λ, and still more preferably 0.5λ. Δn represents a birefringence index of the optically-anisotropic layer 14, and d1 represents a thickness. For example, in a case where light having a wavelength of 940 nm is assumed as incidence light, the retardation R with respect to the light having a wavelength of 940 nm may be in a range of 338 to 602 nm and is preferably 470 nm.

By having the retardation R, the optically-anisotropic layer 14 exhibits a function as a general λ/2 plate, that is, a function of imparting a phase difference of 180° (=π=λ/2) between linearly polarized light components of incidence light perpendicular to each other.

The liquid crystal diffraction element 121 functions as a transmission diffraction grating. The principle in which the liquid crystal diffraction element 121 functions as a diffraction grating will be described with reference to FIGS. 2 and 3.

FIG. 3 is a schematic plan view showing the optically-anisotropic layer 14, that is, a diagram showing FIG. 2 in case of being seen from the top. FIG. 3 shows the example in which the optically-anisotropic layer 14 has the liquid crystal alignment pattern in which the optical axis 22 derived from the liquid crystal compound 20 continuously rotates only in the one in-plane direction.

This example is an example in which the rod-like liquid crystal compound is used as the liquid crystal compound 20. Accordingly, the optical axis 22 matches a longitudinal direction of the liquid crystal compound 20. Regarding this point, the same can also be applied to the reflective liquid crystal diffraction element described below.

As shown in FIGS. 2 and 3, in the optically-anisotropic layer 14, the liquid crystal compound 20 is immobilized in the liquid crystal alignment pattern in which the optical axis 22 changes while continuously rotating in the one in-plane direction. In the example shown in the drawing, the optical axis 22 changes while continuously rotating in the direction along the axis A in FIG. 3 that matches the arrow x direction. That is, the liquid crystal compound 20 is aligned such that an angle between an in-plane component of the major axis (the axis of extraordinary light: director) of the liquid crystal compound 20 defined as the optical axis 22 and the axis A changes while rotating.

As shown in FIG. 3, in the optically-anisotropic layer 14, the direction of the optical axis 22 of the liquid crystal compound 20 is the same in the liquid crystal compound 20 in which that is arranged in a direction perpendicular to the axis A, that is, in an arrow y direction. The optically-anisotropic layer 14 exhibits the above-described general function as $\lambda/2$ plate in regions having the same direction of the optical axis 22 of the liquid crystal compound 20 in the y direction.

The liquid crystal alignment pattern in which the direction of the optical axis 22 changes while rotating is a pattern in which the liquid crystal compound 20 is aligned and immobilized such that an angle between the optical axis 22 of the liquid crystal compound 20 arranged along the axis A and the axis A varies depending on positions in the axis A direction and gradually changes from $\phi$ to $\phi+180°$ or $\phi-180°$.

"Changing while continuously rotating" may represent that regions having the same angle such as 30° rotate to be adjacent to each other in a range of 0° to 180° (=0°) as shown in FIGS. 2 and 3. In addition, a change in the angle of the optical axis 22 in the axis A direction may be rotation at different angle intervals instead of a uniform angle interval. In the present invention, in a case where the average value of the directions of the optical axes 22 in the unit region changes linearly at a constant ratio, it can be said that the direction of the optical axis gradually changes. However, a change in the tilt of the optical axis between unit regions adjacent to each other in the axis A direction and having different tilts of the optical axes 22 is preferably 45° or less. It is preferable that a change in tilt between unit regions adjacent to each other is as small as possible.

In the optically-anisotropic layer 14, the distance over which the angle between the optical axis 22 and the axis A in the axis A direction changes from $\phi$ to $\phi+180°$ (returning to the original position), that is, the period over which the optical axis 22 rotates by 180° will be referred to as "rotation period p". In the liquid crystal diffraction element 121, the rotation period p is a pitch of the periodic structure in the diffraction element.

The rotation period p is preferably 0.5 to 5 µm. As the rotation period p decreases, the diffraction angle, that is, the refraction angle of light from the optically-anisotropic layer 14, that is, the liquid crystal diffraction element 121 increases. Accordingly, the rotation period p may be determined depending on a wavelength of incidence light into the liquid crystal diffraction element 121 and a desired emission angle.

With the above-described configuration of the optically-anisotropic layer 14, that is, the liquid crystal alignment pattern, the liquid crystal diffraction element 121 imparts a phase difference of $\lambda/2$ to the incidence light and diffracts (refracts) and emits incidence light incident at an incidence angle of 0°, that is, vertically incident light at an emission angle $\theta_2$.

Figure 4:
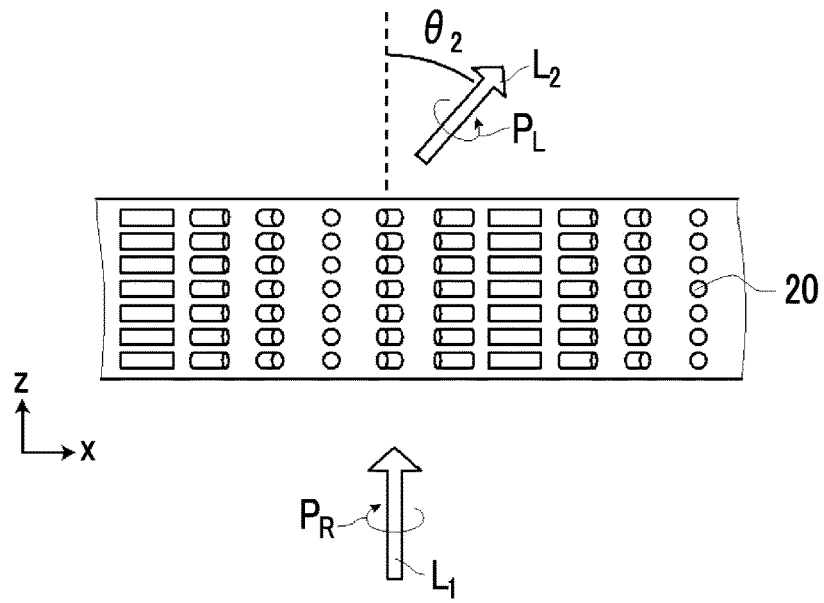
FIG. 4 is a conceptual diagram showing an action of the liquid crystal diffraction element shown in FIG. 2.

That is, as conceptually shown in FIG. 4, in a case where light $L_1$ of right circularly polarized light $P_R$ is vertically incident into a main surface (maximum surface) of the optically-anisotropic layer 14, light $L_2$ of left circularly polarized light $P_L$ is emitted in a direction having an angle $\theta_2$ with respect to the normal direction. In other words, light being vertically incident into the main surface of the optically-anisotropic layer 14 is light being incident along the normal line of the surface.

In the following description, the light $L_1$ of right circularly polarized light $P_R$ incident into the optically-anisotropic layer 14 will also be referred to as "incidence light $L_1$". Further, in the following description, the light $L_2$ of left circularly polarized light $P_L$ emitted the optically-anisotropic layer will also be referred to as "emitted light $L_2$".

In the liquid crystal diffraction element 121, in a case where light having a predetermined wavelength is incident, as the rotation period p of the optically-anisotropic layer 14 decreases, the diffraction angle, that is, the emission angle of the emitted light $L_2$ increases. The emission angle of the emitted light $L_2$ is an angle between the normal direction of the optically-anisotropic layer 14 and the emitted light $L_2$.

The liquid crystal diffraction element 121 has different diffraction orientations for right circularly polarized light and left circularly polarized light. Therefore, regarding the diffraction direction of the emitted light $L_2$ from the liquid crystal diffraction element 121, the state of circularly polarized light to be incident into the liquid crystal diffraction element 121 is controlled to be incident. That is, in a case where incidence light is linearly polarized light, by inserting the $\lambda/4$ plate to convert the linearly polarized light into left circularly polarized light or right circularly polarized light such that the converted light is incident, the orientation of diffraction of light can be controlled to only one of the right or left side.

Specifically, in the example shown in FIG. 4, in a case where incidence light $L_1$ of right circularly polarized light $P_R$ is incident along the normal line of the main surface of the liquid crystal diffraction element 121, the incident light is diffracted in a direction having the angle $\theta_2$ with respect to the normal direction, that is, in the x direction (axis A direction, the right direction in the drawing), and emitted light $L_2$ of left circularly polarized light $P_L$ is emitted.

In this case, in a case where left circularly polarized light is incident into the liquid crystal diffraction element 121 as incidence light, the light is converted into right circularly polarized light in the optically-anisotropic layer 14, and the emitted light is diffracted and emitted in a direction opposite to that of FIG. 4, that is, in a direction (the left direction in the drawing) opposite to the x direction (axis A direction).

The wavelength $\lambda$ of light that is diffracted due to the liquid crystal diffraction element 121 (optically-anisotropic layer 14) may be in an ultraviolet range, a visible range, or an infrared range or may be on an electromagnetic wave level.

At the same rotation period p, as the wavelength of the incidence light increases, the diffraction angle increases, and as the wavelength of the incidence light decreases, the diffraction angle decreases. That is, in a case where the rotation periods p are the same, the diffraction angle of light in a wavelength range of infrared light to ultraviolet light decreases in order of infrared light>red light>green light>blue light>and ultraviolet light.

As the liquid crystal compound 20, a rod-like liquid crystal compound or a disk-like liquid crystal compound can be used.

In the above description, the example in which incidence light is vertically incident into the optically-anisotropic layer is described. However, even in a case where incidence light is obliquely incident into the optically-anisotropic layer, the effect of transmission diffraction can also be obtained.

As described above, in the light deflection device 100 according to the embodiment of the present invention, light deflected from the light deflection element 101 is diffracted by the liquid crystal diffraction element 121 (optically-anisotropic layer 14) such that the light can be deflected at a deflection angle of the maximum emission angle θmaxout that is significantly more than the maximum deflection angle θmax of the light deflection element 101.

In addition, the diffraction angle of light from the optically-anisotropic layer 14 increases as the single period over which the optical axis 22 of the liquid crystal compound 20 rotates by 180°, that is, the rotation period p decreases.

Further, in a case where the deflection directions (turning directions) of circularly polarized light to be incident are the same, the diffraction direction of light from the optically-anisotropic layer 14 is reversed by the rotation direction of the optical axis 22 of the liquid crystal compound 20.

That is, in a case where the incidence light $L_1$ is right circularly polarized light $P_R$ and the rotation direction of the optical axis 22 is clockwise in the axis A direction (arrow x direction) in a view from the emission surface side as shown in FIGS. 2 to 4, the emitted light $L_2$ is diffracted, for example, in the axis A direction.

On the other hand, in a case where the incidence light $L_1$ is right circularly polarized light $P_R$ and the rotation direction of the optical axis 22 is counterclockwise in the axis A direction from the emission surface side, the emitted light $L_2$ is diffracted in the direction opposite to the axis A direction.

Accordingly, in the optically-anisotropic layer 14 of the light deflection device 100 according to the embodiment of the present invention, the rotation period p of the optical axis 22 of the liquid crystal compound 20 in the axis A direction gradually decreases from the inner side (center) of deflection (deflection orientation) from the light deflection element 101 toward the outer side. That is, the diffraction angle of light from the optically-anisotropic layer 14 increases toward the outer side in the deflection direction.

Further, in the optically-anisotropic layer 14 of the light deflection device 100 according to the embodiment of the present invention, the rotation direction of the optical axis 22 of the liquid crystal compound 20 in the axis A direction is reversed at the center of deflection from the light deflection element 101. For example, in the example shown in the drawing, the rotation direction of the optical axis 22 in the axis A direction is set to be counterclockwise from the upstream side in the axis A direction to the center in the deflection direction, the rotation direction of the optical axis 22 is reversed at the center of deflection, and the rotation direction of the optical axis 22 is set to be clockwise from the center of deflection to the downstream side in the axis A direction.

In a case where the light deflection device 100 according to the embodiment of the present invention has the above-described configuration, the light is diffracted (refracted) from the center toward both sides (the upstream side and the downstream side) in the axis A direction, and the diffraction angle of light gradually increases from the center toward both sides in the axis A direction. As a result, the light can be deflected at a deflection angle of the maximum emission angle θmaxout that is significantly more than the maximum deflection angle θmax of the light deflection element 101.

The rotation direction of the optical axis 22 is reversed at the center of the optically-anisotropic layer 14 in the axis A direction (arrow x direction), that is, in the one in-plane direction in which the optical axis 22 rotates. That is, in the light deflection device 100, typically, the center of deflection from the light deflection element 101 and the center of optically-anisotropic layer 14 in the axis A direction are matched to each other.

In the present invention, the rotation period p of the optically-anisotropic layer 14 forming the liquid crystal diffraction element 121 may decrease continuously or stepwise from the center of deflection toward the outer side as long as the rotation period p gradually decreases.

<Formation of Optically-Anisotropic Layer>

For example, the optically-anisotropic layer 14 is formed using the liquid crystal composition including the liquid crystal compound.

In order to form the optically-anisotropic layer 14, the liquid crystal composition including the liquid crystal compound may include other components such as a leveling agent, an alignment control agent, a polymerization initiator, or an alignment assistant in addition to the liquid crystal compound. By forming an alignment film on the support, applying the liquid crystal composition to the alignment film, and curing the applied liquid crystal composition, the optically-anisotropic layer consisting of the cured layer of the liquid crystal composition is obtained by immobilizing the predetermined liquid crystal alignment pattern can be obtained.

Next, each of the components of the liquid crystal composition according to the embodiment of the present invention will be described in detail.

The optically-anisotropic layer 14 is formed of a cured layer of a liquid crystal composition including a rod-like liquid crystal compound or a disk-like liquid crystal compound, and has a liquid crystal alignment pattern in which an optical axis of the rod-like liquid crystal compound or an optical axis of the disk-like liquid crystal compound is aligned as described above.

By forming an alignment film on the support 12, applying the liquid crystal composition to the alignment film, and curing the applied liquid crystal composition, the optically-anisotropic layer consisting of the cured layer of the liquid crystal composition can be obtained. Although the optically-anisotropic layer functions as a so-called λ/2 plate, the present invention includes an aspect where a laminate including the support 12 and the alignment film that are integrated functions as a λ/2 plate.

In addition, the liquid crystal composition for forming the optically-anisotropic layer includes a rod-like liquid crystal compound or a disk-like liquid crystal compound and may further include other components such as a leveling agent, an alignment control agent, a polymerization initiator, or an alignment assistant.

In addition, it is desirable that the optically-anisotropic layer has a wide range for the wavelength of incidence light and is formed of a liquid crystal material having a reverse birefringence index dispersion.

Further, it is also preferable that the optically-anisotropic layer can be made to have a substantially wide range for the wavelength of incidence light by imparting a twist component to the liquid crystal composition or by laminating different retardation layers. For example, in the optically-anisotropic layer, a method of realizing a λ/2 plate having a wide-range pattern by laminating two liquid crystal layers having different twisted directions is disclosed in, for example, JP2014-089476A and can be preferably used in the present invention.

—Rod-Like Liquid Crystal Compound—

As the rod-like liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-like liquid crystal compound, not only the above-described low molecular weight liquid crystal molecules but also high molecular weight liquid crystal molecules can be used.

It is preferable that the alignment of the rod-like liquid crystal compound is immobilized by polymerization. Examples of the polymerizable rod-like liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A. WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-064627. Further, as the rod-like liquid crystal compound, for example, compounds described in JP1999-513019A (JP-H11-513019A) and JP2007-279688A can also be preferably used.

—Disk-Like Liquid Crystal Compound—

As the disk-like liquid crystal compound, for example, compounds described in JP2007-108732A and JP2010-244038A can be preferably used.

In a case where the disk-like liquid crystal compound is used in the optically-anisotropic layer, the liquid crystal compound 20 rises in the thickness direction in the optically-anisotropic layer, and the optical axis 22 derived from the liquid crystal compound 20 is defined as an axis perpendicular to a disk surface, that is so-called, a fast axis.

Optionally, the optically-anisotropic layer 14 may be formed by applying multiple layers of the liquid crystal composition to the alignment film 13.

The application of the multiple layers refers to repetition of the following processes including: preparing a first liquid crystal immobilized layer by applying the liquid crystal composition to the alignment film, heating the liquid crystal composition, cooling the liquid crystal composition, and irradiating the liquid crystal composition with ultraviolet light for curing; and preparing a second or subsequent liquid crystal immobilized layer by applying the liquid crystal composition to the liquid crystal immobilized layer, heating the liquid crystal composition, cooling the liquid crystal composition, and irradiating the liquid crystal composition with ultraviolet light for curing as described above. Even in a case where the optically-anisotropic layer 14 is formed by the application of the multiple layers as described above such that the total thickness of the optically-anisotropic layer 14 is large, the alignment direction of the alignment film 13 can be reflected from a lower surface of the optically-anisotropic layer 14 to an upper surface thereof.

Figure 5:
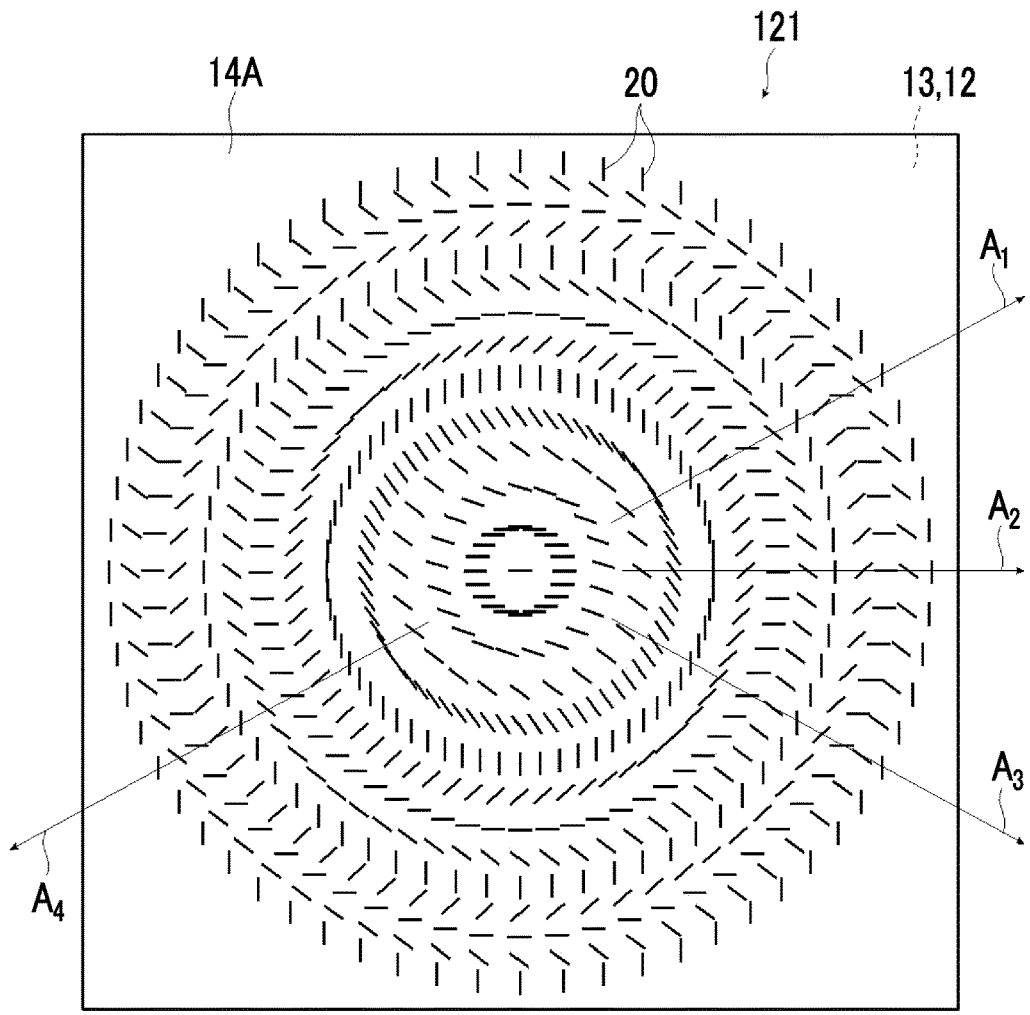
FIG. 5 is a schematic plan view showing the liquid crystal diffraction element shown in FIG. 2.

FIG. 5 is a schematic plan view showing an optically-anisotropic layer in a design modification example of the liquid crystal diffraction element.

An optically-anisotropic layer 14A shown in FIG. 5, that is, the liquid crystal diffraction element 121 including the optically-anisotropic layer 14A corresponds to the case where the deflection direction of the light deflection element 101 is radial (two-dimensional), As described above, the liquid crystal alignment pattern of the optically-anisotropic layer can be formed using the exposure device shown in FIG. 7.

The optically-anisotropic layer 14A has the liquid crystal alignment pattern in which the direction of the optical axis 22 gradually changes while rotating in multiple directions from the center side toward the outer side, for example along axes $A_1$, $A_2$, $A_3$, and . . . .

That is, the optically-anisotropic layer 14A has a liquid crystal alignment pattern in a radial shape from an inner side (center) toward an outer side, the liquid crystal alignment pattern being a pattern in which the direction of the optical axis derived from the liquid crystal compound 20 changes while continuously rotating in the one direction. In other words, the liquid crystal alignment pattern in the optically-anisotropic layer 14A shown in FIG. 5 is a concentric circular pattern having a concentric circular shape where the one in-plane direction in which the direction of the optical axis derived from the liquid crystal compound 20 changes while continuously rotating moves from an inner side toward an outer side.

In the optically-anisotropic layer 14A, the direction of the optical axis of the liquid crystal compound 20 changes while continuously rotating in a direction in which a large number of optical axes move to the outer side from the center of the optically-anisotropic layer 14A, for example, along the axis $A_1$, the axis $A_2$, the axis $A_3$, the axis $A_4$, and . . . .

In the optically-anisotropic layer 14A, the rotation direction of the optical axis of the liquid crystal compound 20 is the same as all the directions (one in-plane direction). In the example shown in the drawing, in all the directions along the axis $A_1$, the axis $A_2$, the axis $A_3$, the axis $A_4$, and . . . , the rotation direction of the optical axis of the liquid crystal compound 20 is clockwise.

That is, in a case where the axis $A_1$ and the axis $A_4$ are assumed as one straight line, the rotation direction of the optical axis of the liquid crystal compound 20 at the center of the optically-anisotropic layer 14A is reversed on the straight line. For example, the straight line formed by the axis $A_1$ and the axis $A_4$ is directed in the right direction (axis $A_1$ direction) in the drawing. In this case, the optical axis 20A of the liquid crystal compound 20 rotates counterclockwise to the center from the outer direction of the optically-anisotropic layer 14A, the rotation direction is reversed at the center of the optically-anisotropic layer 14A, and then the optical axis 20A of the liquid crystal compound 20 rotates clockwise from the center of the optically-anisotropic layer 14A to the outer direction thereof.

In addition, in a preferable aspect, the rotation period p of the liquid crystal alignment pattern gradually decreases from the inner side (center) toward the outer side in the direction of each of the axes. That is, the rotation period p of the liquid crystal alignment pattern gradually decreases in the direction of each of the axes (arrows).

As described above, in the optically-anisotropic layer having the liquid crystal alignment pattern in which the optical axis of the liquid crystal compound 20 continuously rotates in the one in-plane direction, incident circularly polarized light is diffracted (refracted) in the opposite direction depending on the turning direction of the circularly polarized light.

In addition, in the optically-anisotropic layer (liquid crystal diffraction element) having the liquid crystal alignment pattern in which the direction of the optical axis of the liquid crystal compound 20 changes while continuously rotating in the one in-plane direction, a diffraction direction of transmitted light depends on the rotation direction of the optical axis of the liquid crystal compound 20. That is, in this liquid crystal alignment pattern, in a case where the rotation direction of the optical axis of the liquid crystal compound 20 is reversed, the refraction direction of transmitted light is also reversed with respect to the one in-plane direction in which the optical axis rotates.

Further, the diffraction angle of the optically-anisotropic layer increases as the rotation period p decreases. That is, the refraction of light of the optically-anisotropic layer increases as the rotation period p decreases.

Accordingly, in the optically-anisotropic layer 14A having the concentric circular liquid crystal alignment pattern, that is, the liquid crystal alignment pattern in which the optical axis 20A changes while continuously rotating in a radial shape, transmission of incident light can be allowed as diverging light or collected light. That is, a function as a convex lens or a concave lens can be implemented by the turning direction of incident circularly polarized light in the optically-anisotropic layer 14A.

In the light deflection device 100 according to the embodiment of the present invention, in a case where the liquid crystal diffraction element 121 including the optically-anisotropic layer 14A shown in FIG. 5 is used, the optically-anisotropic layer 14A shown in FIG. 5 can be used to function as a concave lens. As a result, in the liquid crystal diffraction element 121 including the optically-anisotropic layer 14A shown in FIG. 5, light that is deflected in a radial shape by the light deflection element 101 can be further deflected to be diffused from the center toward the outer side in the deflection direction.

In this case, in a case where the center of the lens is matched to the center of emitted light (deflection direction) of the light deflection element 101, the maximum deflection angle θmax of light emitted from the light deflection element can be increased most efficiently.

As described above, In the light deflection device according to the embodiment of the present invention, by using a liquid crystal diffraction element 121A for the function of the concave lens of the optically-anisotropic layer 14A shown in FIG. 5, light can be deflected so as to be diffused in a radial shape from the center.

Figure 9:
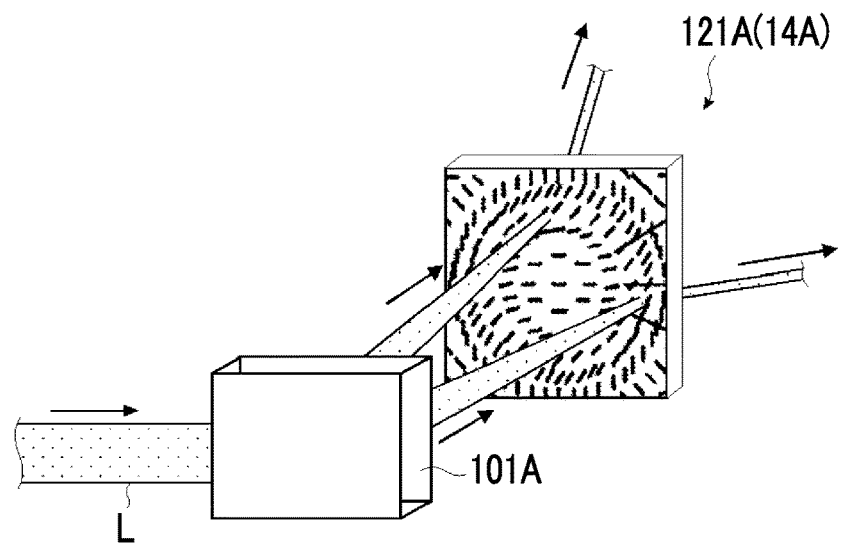
FIG. 9 is a conceptual diagram showing an action of a light deflection device according to the present invention.

For example, in the light deflection device according to the embodiment of the present invention, as conceptually shown in FIG. 9, the liquid crystal diffraction element 121A including the optically-anisotropic layer 14A that functions as a concave lens is used, and a MEMS light deflection element 101A that deflects light in a radial shape (two-dimensional) is used as the light deflection element. The MEMS light deflection element 101A deflects light, for example, at an orientation of 360° and a polar angle of 0° to 35°.

As a result, as shown in FIG. 9, the light L deflected in a radial shape from the MEMS light deflection element 101A is diffracted from the liquid crystal diffraction element 121A such that the deflection angle, that is, the azimuthal angle from the MIMS light deflection element 101A can be increased, and light can be deflected in a radial shape in a wide range.

In addition, in the light deflection device according to the embodiment of the present invention, the reflection plate of the MEMS light deflection element 101A has the light collecting function. By causing collected light to be incident into the liquid crystal diffraction element 121A, the light refracted by the liquid crystal diffraction element 121A can be deflected and emitted as parallel light.

In the above-described example, the liquid crystal compound 20 of the liquid crystal diffraction element 121 (optically-anisotropic layer) faces one side in the thickness direction, but the present invention is not limited thereto.

Figure 8:
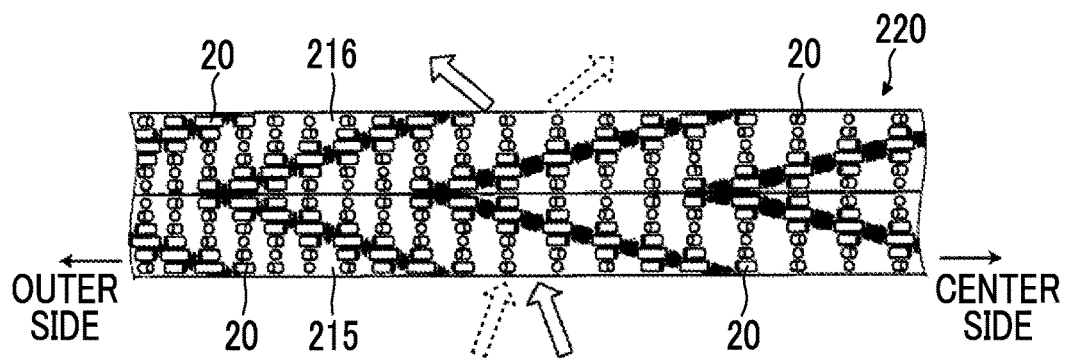
FIG. 8 is a conceptual diagram showing another example of the transmissive liquid crystal diffraction element.

In the light deflection device according to the embodiment of the present invention, the optically-anisotropic layer forming the liquid crystal diffraction element may include the liquid crystal compound 20 that is twisted and aligned along a helical axis extending in the thickness direction as in a first optically-anisotropic layer 215 and a second optically-anisotropic layer 216 of a liquid crystal diffraction element 220 conceptually shown in FIG. 8. In the following description, the twisted alignment along the helical axis extending in the thickness direction will also simply referred to as "twisted alignment".

The first optically-anisotropic layer 215 and the second optically-anisotropic layer 216 in which the liquid crystal compound 20 is twisted and aligned are tilted optically-anisotropic layers in which, in a cross-sectional SEM image obtained by observing a cross-section of the liquid crystal diffraction element 220 with a scanning electron microscope (SEM), bright and dark lines derived from the twisted alignment of the liquid crystal compound 20 are tilted with respect to the normal line of an interface between the first optically-anisotropic layer 215 and the second optically-anisotropic layer 216 as shown in FIG. 8.

As described above, in the liquid crystal alignment pattern, in a case where the single period (rotation period p) over which the optical axis of the liquid crystal compound rotates by 180° gradually decreases in the direction in which the optical axis 22 rotates, the tilt angle of the bright and dark lines with respect to the normal line of the first optically-anisotropic layer 215 and the second optically-anisotropic layer 216 gradually decreases in the direction in which the optical axis 22 rotates. That is, in this case, the tilt angle of the bright and dark lines rises with respect to the main surface of the optically-anisotropic layer. Further, in this case, in the pattern of the bright and dark lines of the first optically-anisotropic layer 215 and the second optically-anisotropic layer 216, the period decreases in the direction in which the optical axis 22 rotates.

This way, in the optically-anisotropic layer including the twisted and aligned liquid crystal compound 20, the diffraction efficiency of light can be improved even by high-angle diffraction. As a result, as compared to the optically-anisotropic layer shown in FIG. 2 in which the liquid crystal compound is not twisted and aligned, a decrease in light amount in the optically-anisotropic layer can be suppressed, and the amount of emitted light can be improved.

In the liquid crystal diffraction element 220, the twisted direction in the twisted alignment of the liquid crystal compound 20 in the first optically-anisotropic layer 215 is different from that in the second optically-anisotropic layer 216. That is, in the first optically-anisotropic layer 215, the liquid crystal compound 20 is twisted and aligned clockwise in the light traveling direction. That is, in the second optically-anisotropic layer 216, the liquid crystal compound 20 is twisted and aligned counterclockwise in the light traveling direction.

Therefore, the direction of tilt of the bright and dark lines derived from the twisted alignment in the cross-sectional SEM image of the first optically-anisotropic layer 215 is different from that in the second optically-anisotropic layer 216.

In the first optically-anisotropic layer 215, for example, in a case where incidence light is right circularly polarized light, the effect of improving the diffraction efficiency is high for light that travels to the left side (outer side) indicated by a solid line in the drawing. However, in the first optically-anisotropic layer 215, for example, in a case where incidence light is right circularly polarized light, the effect of improving the diffraction efficiency is low for light that travels to the right side (center side) indicated by a broken line in the drawing.

On the other hand, in the second optically-anisotropic layer 216, in a case where incidence light is right circularly polarized light, conversely, the effect of improving the diffraction efficiency is low for light that travels to the left side (outer side) indicated by a solid line in the drawing. However, in the second optically-anisotropic layer 216, in a case where incidence light is right circularly polarized light, the effect of improving the diffraction efficiency is high for light that travels to the right side (center side) indicated by a broken line in the drawing.

The effects are opposite in a case where incidence light is left circularly polarized light.

In the liquid crystal diffraction element 220, in the region at the center of polarization, the incidence angle of incidence light into the optically-anisotropic layer is small. Therefore, both of the first optically-anisotropic layer 215 and the second optically-anisotropic layer 216 contribute to the improvement of the diffraction efficiency.

As a result, in the liquid crystal diffraction element 220 including the first optically-anisotropic layer 215 and the second optically-anisotropic layer 216 that have different twisted directions in the twisted alignment of the liquid crystal compound 20, the effect of improving the diffraction efficiency can be obtained over the entire region in the light deflection direction, and a large amount of light can be emitted in the entire range of the deflection angle.

In the optically-anisotropic layer in which the liquid crystal compound 20 is twisted and aligned, the twisted angle of the liquid crystal compound is not limited. The twisted angle of the liquid crystal compound may be appropriately set according to the deflection angle from the light deflection element, the desired diffraction efficiency, and the like.

In the optically-anisotropic layer in which the liquid crystal compound 20 is twisted and aligned, the twisted angle of the liquid crystal compound 20 is preferably 10° to 200°, more preferably 20° to 190°, and still more preferably 40° to 170°.

The twisted angle of the twisted and aligned liquid crystal compound 20 (the twisted angle in the thickness direction) refers to a twisted angle from a lower surface to an upper surface of the liquid crystal compound 20 that is twisted and aligned along the helical axis extending in the thickness direction in the optically-anisotropic layer.

[Light Collecting Action of Reflection Plate of MEMS Light Deflection Element]

As described above, the light deflection device 100 in the example shown in the drawing includes the MEMS light deflection element where the reflection plate has the light collecting function.

The angle increased by the angle increasing optical element such as the hologram diffraction element or the above-described transmissive liquid crystal diffraction element gradually increases from the center toward the outer side in the deflection direction.

On the other hand, light, that is, a light beam deflected by the light deflection device 100 is thick in practice. Therefore, to be exact, the amounts of refraction of light from the optically-anisotropic layer 14 on the inner side (the center side of deflection) and the outer side in the deflection direction are different from each other, and the amount of refraction of light on the outer side is more than that on the inner side. Therefore, the light refracted from the liquid crystal diffraction element 121 increases in diameter so as to be slightly diffused.

In order to avoid the inconvenience, the light that is deflected and emitted by the light deflection element may be collected light. As a method of realizing this configuration, a method of disposing an optical element that collects light, for example, a condenser lens on the upstream side of the light deflection element is considered. However, in this method, the optical member such as a condenser lens needs to be added to the light deflection device, the size of the light deflection device increases, and the configuration of the device also becomes complicated.

On the other hand, in the light deflection device 100 according to the embodiment of the present invention, by imparting the light collecting function to the reflection plate of the MEMS light deflection element 101 such that the light incident into the liquid crystal diffraction element 121 slightly decreases in diameter, light emitted from the light deflection device 100 (liquid crystal diffraction element 121) can be converted into parallel light to improve straightness. As a result, the scanning of light using the light deflection device 100 can be accurately performed even in a case where an object to be scanned with light is distant from the light deflection device 100.

Further, in the light deflection device 100 according to the embodiment of the present invention, the optical element such as a condenser lens does not need to be disposed on the upstream side of the MEMS light deflection element 101.

Accordingly, in the present invention, a high-performance light deflection device can be realized using a simple driving method with a small and simple configuration.

The light collecting power of the reflection plate of the MEMS light deflection element 101 is not limited. That is, the refractive power of the reflection plate of the MEMS light deflection element may be appropriately set to refractive power capable of emitting suitable light based on the amount of refraction of light from the liquid crystal diffraction element 121 and the in-plane distribution thereof (that is, an in-plane distribution function of a diffraction pitch), the deflection angle of light from the light deflection device 100, the distance between the light deflection device 100 and the object to be scanned with light, the diameter of incidence light (beam diameter), and the like.

[Reflection Plate of MEMS Light Deflection Element]

In the light deflection element 101, the reflection plate having the above-described light collecting function can be realized by using the diffraction element as the reflection plate as described above.

As the diffraction element having the light collecting function, as described above, various well-known diffraction elements such as the photonic crystal, the hologram diffraction element, or the surface relief diffraction element can be used, and the liquid crystal diffraction element is preferable. In particular, the reflective liquid crystal diffraction element can be suitably used.

Specifically, by using the cholesteric liquid crystal having the same liquid crystal alignment pattern as that of the transmissive liquid crystal diffraction element 121 (optically-anisotropic layer), reflective diffracted light is generated, and the direction of reflected light is controlled.

[Reflective Liquid Crystal Diffraction Element]

Figure 11:
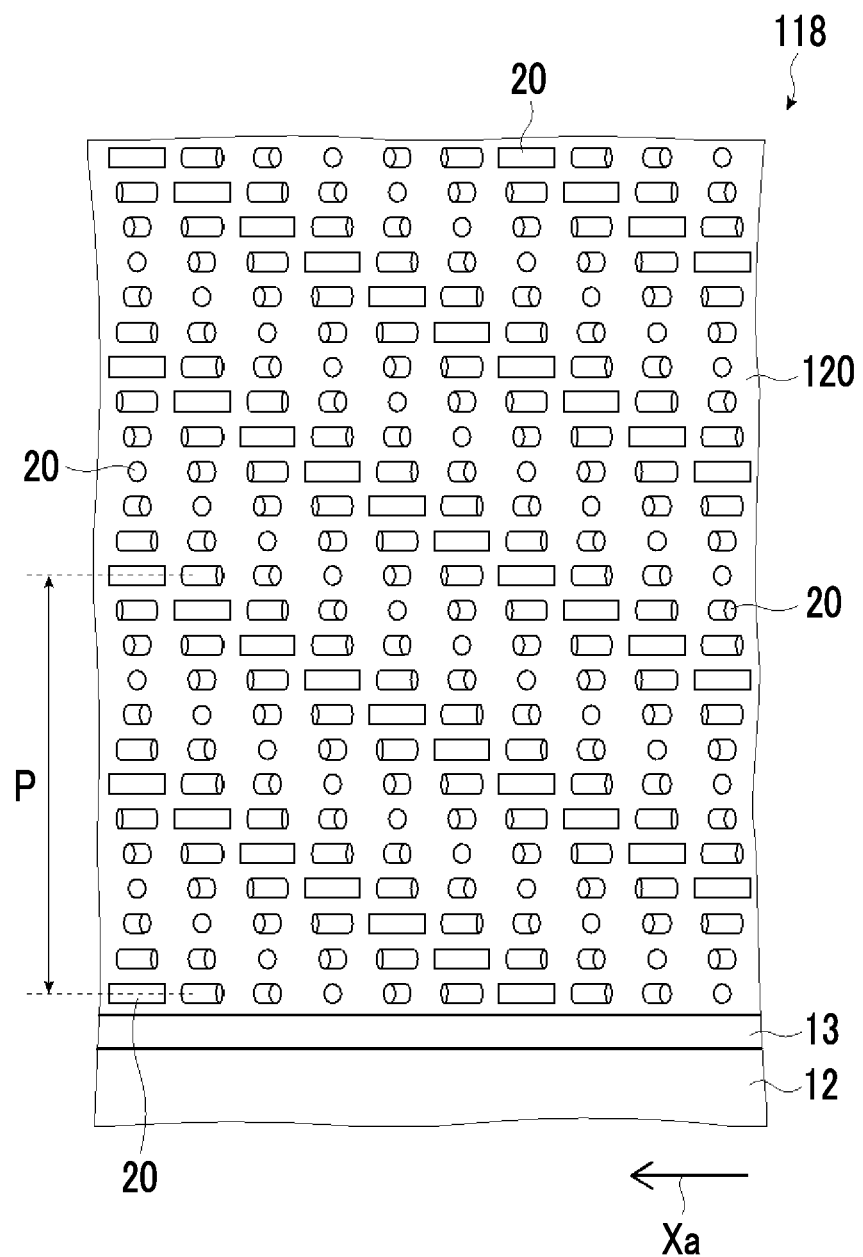
FIG. 11 is a conceptual diagram showing a reflective liquid crystal diffraction element.

FIG. 11 conceptually shows an example of a reflective liquid crystal diffraction element 118.

In the liquid crystal diffraction element 118 shown in FIG. 11, the same members as those of the liquid crystal diffraction element 121 shown in FIG. 2 are widely used. Therefore, the same members are represented by the same reference numerals, and different members will be mainly described below.

The liquid crystal diffraction element 118 shown in FIG. 11 includes the support 12, the alignment film 13, and a cholesteric liquid crystal layer 120.

Both of the support 12 and the alignment film 13 are the same as those in the above-described liquid crystal diffraction element 121. Accordingly, the exposure of the alignment film 13 may be performed using the exposure device shown in FIG. 6 in a case where the liquid crystal alignment pattern where the optical axis 20A of the liquid crystal compound 20 rotates only in the one in-plane direction shown in FIG. 3 is formed. On the other hand, in a case where the liquid crystal alignment pattern shown in FIG. 5 having, in a radial shape, the one in-plane direction in which the optical axis 20A of the liquid crystal compound 20 rotates, that is, the concentric circular liquid crystal alignment pattern is formed, the exposure of the alignment film 13 may be performed using the exposure device shown in FIG. 7.

<Cholesteric Liquid Crystal Layer>

The cholesteric liquid crystal layer 120 is formed on a surface of the alignment film 13.

The cholesteric liquid crystal layer 120 is a layer obtained by immobilizing a cholesteric liquid crystalline phase. In other words, the cholesteric liquid crystal layer is a layer obtained by immobilizing the liquid crystal compound in a cholesteric alignment state.

In the light deflection device 100 according to the embodiment of the present invention, in a case where the reflective liquid crystal diffraction element including the cholesteric liquid crystal layer as the reflection plate of the light deflection element is used, the cholesteric liquid crystal layer has the liquid crystal alignment pattern in which the direction of the optical axis 20A derived from the liquid crystal compound 20 changes while continuously rotating in at least one in-plane direction.

As conceptually shown in FIG. 11, the cholesteric liquid crystal layer 120 has a helical structure in which the liquid crystal compound 20 is helically turned and laminated as in a cholesteric liquid crystal layer obtained by immobilizing a typical cholesteric liquid crystalline phase. In the helical structure, a configuration in which the liquid crystal compound 20 is helically rotated once (rotated by 360°) and laminated is set as one helical pitch, and plural pitches of the helically turned liquid crystal compound 20 are laminated.

As is well-known, the cholesteric liquid crystal layer obtained by immobilizing a cholesteric liquid crystalline phase has wavelength-selective reflectivity. Although described below in detail, the selective reflection wavelength range of the cholesteric liquid crystal layer depends on the length (pitch P shown in FIG. 11) of one helical pitch described above in the thickness direction.

In addition, the cholesteric liquid crystal layer selectively reflects right circularly polarized light or left circularly polarized light depending on the helical turning direction of the liquid crystal compound 20.

The cholesteric liquid crystal layer allows transmission of light in the selective reflection wavelength range other than circularly polarized light in the turning direction that is selectively reflected.

Accordingly, in the configuration where wavelength selectivity is imparted to the liquid crystal diffraction element to diffract only light having a predetermined wavelength, the selective reflection wavelength range of the cholesteric liquid crystal layer may be appropriately set by adjusting the helical pitch P of the cholesteric liquid crystal layer.

<<Cholesteric Liquid Crystalline Phase>>

It is known that the cholesteric liquid crystalline phase exhibits selective reflectivity at a specific wavelength.

A center wavelength of selective reflection (selective reflection center wavelength) $\lambda$ of a general cholesteric liquid crystalline phase depends on a helical pitch P in the cholesteric liquid crystalline phase and satisfies a relationship of $\lambda = n \times P$ with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the pitch P increases.

As described above, the helical pitch P refers to one pitch (period of helix) of the helical structure of the cholesteric liquid crystalline phase, in other words, one helical turn. That is, the helical pitch refers to the length in a helical axis direction in which a director (in the case of a rod-like liquid crystal, a major axis direction) of the liquid crystal compound constituting the cholesteric liquid crystalline phase rotates by 360°.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

The details of the adjustment of the pitch can be found in "Fuji Film Research & Development" No. 50 (2005), p. 60 to 63. As a method of measuring a helical sense and a helical pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

The cholesteric liquid crystalline phase exhibits selective reflectivity with respect to left or right circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystal layer is right, right circularly polarized light is reflected, and in a case where the helical twisted direction of the cholesteric liquid crystal layer is left, left circularly polarized light is reflected.

A turning direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection wavelength range (circularly polarized light reflection wavelength range) where selective reflection is exhibited depends on $\Delta n$ of the cholesteric liquid crystalline phase and the helical pitch P and satisfies a relationship of $\Delta\lambda = \Delta n \times P$. Therefore, the width of the selective reflection wavelength range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the use of the diffraction element and may be, for example, 10 to 500 nm and is preferably 20 to 300 nm and more preferably 30 to 100 nm.

<<Method of Forming Cholesteric Liquid Crystal Layer>>

The cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 20 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including the above-described rod-like or disk-like liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Surfactant—

The liquid crystal composition used for forming the cholesteric liquid crystal layer may include a surfactant. It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %*, more preferably 0.01 to 5 mass %, and still more preferably 0.02 to 1 mass % with respect to the total mass of the liquid crystal compound.

—Chiral Agent (Optically Active Compound)—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide, or an isomannide derivative can be used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-

179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which can initiate a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667λ (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane, in addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3 to 20 mass % and more preferably 5 to 15 mass % with respect to the solid content mass of the liquid crystal composition. In a case where the content of the crosslinking agent is in the above-described range, an effect of improving a crosslinking density can be easily obtained, and the stability of a cholesteric liquid crystalline phase is further improved.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the cholesteric liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether.

Among these organic solvents, one kind may be used alone, or two or more kinds may be used in combination. Among these, a ketone is preferable in consideration of an environmental burden.

In a case where the cholesteric liquid crystal layer is formed, it is preferable that the cholesteric liquid crystal layer is formed by applying the liquid crystal composition to a surface where the cholesteric liquid crystal layer is to be formed, aligning the liquid crystal compound to a state of a cholesteric liquid crystalline phase, and curing the liquid crystal compound.

That is, in a case where the cholesteric liquid crystal layer is formed on the alignment film 13, it is preferable that the cholesteric liquid crystal layer obtained by immobilizing a cholesteric liquid crystalline phase is formed by applying the liquid crystal composition to the alignment film 13, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the cholesteric liquid crystal layer. In the drying and/or heating step, the liquid crystal compound in the liquid crystal composition only has to be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization or photopolymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

The thickness of the cholesteric liquid crystal layer is not particularly limited, and the thickness with which a required light reflectivity can be obtained may be appropriately set depending on the use of the cholesteric liquid crystal layer, the light reflectivity required for the cholesteric liquid crystal layer, the material for forming the cholesteric liquid crystal layer, and the like.

<<Liquid Crystal Alignment Pattern of Cholesteric Liquid Crystal Layer>>

As described above, in the cholesteric liquid crystal layer, the cholesteric liquid crystal layer has the liquid crystal alignment pattern in which the direction of the optical axis 20A derived from the liquid crystal compound 20 forming the cholesteric liquid crystalline phase changes while continuously rotating in the one in-plane direction of the cholesteric liquid crystal layer.

The optical axis 20A derived from the liquid crystal compound 20 is an axis having the highest refractive index in the liquid crystal compound 20, that is, a so-called slow axis.

For example, in a case where the liquid crystal compound 20 is a rod-like liquid crystal compound, the optical axis 20A is along a rod-like major axis direction. In the following description, the optical axis 20A derived from the liquid crystal compound 20 will also be referred to as "the optical axis 20A of the liquid crystal compound 20" or "the optical axis 20A".

Figure 12:
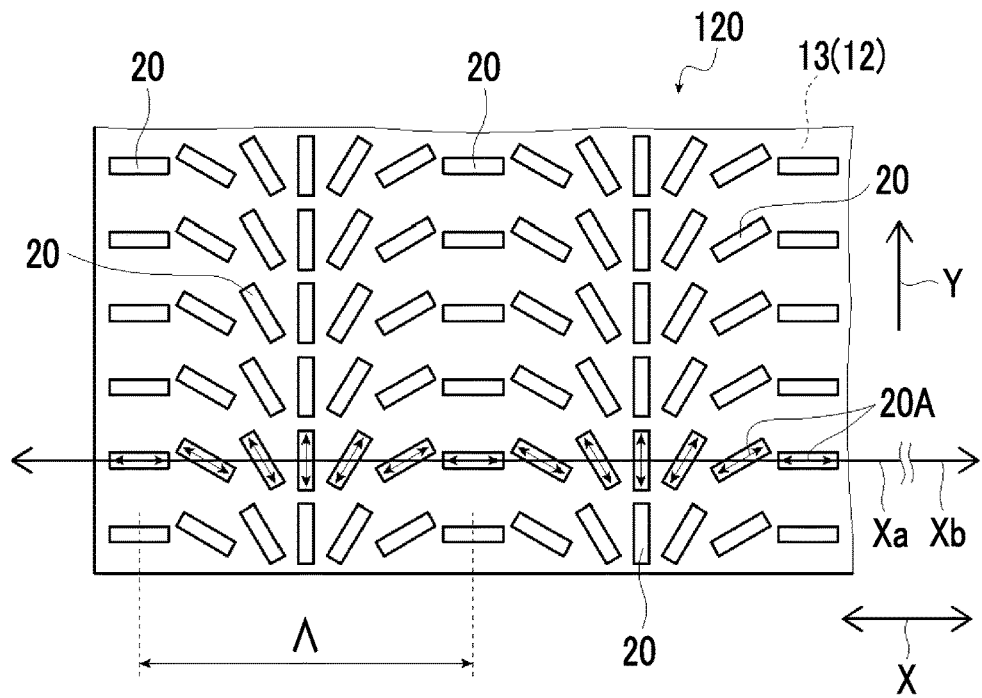
FIG. 12 is a conceptual diagram showing an action of the liquid crystal diffraction element shown in FIG. 11.

FIG. 12 conceptually shows a plan view of the cholesteric liquid crystal layer 120.

The plan view is a view in a case where the cholesteric liquid crystal layer is seen from the top in FIG. 11, that is, a view in a case where the cholesteric liquid crystal layer 120 is seen from a thickness direction (laminating direction of the respective layers (films)).

In addition, in FIG. 12, in order to clarify the configuration of the cholesteric liquid crystal layer 120, only the liquid crystal compound 20 on the surface of the alignment film 13 is shown. However, actually, in the configuration shown in FIG. 11, the liquid crystal compound 20 is helically turned and aligned and is laminated in several pitches.

As shown in FIG. 12, on the surface of the alignment film 13, the liquid crystal compound 20 forming the cholesteric liquid crystal layer 120 has the liquid crystal alignment pattern in which the direction of the optical axis 20A changes while continuously rotating in the predetermined one in-plane direction indicated by arrow Xa in a plane of the cholesteric liquid crystal layer according to the alignment pattern formed on the alignment film 13 as the lower layer. In FIG. 12, the liquid crystal compound 20 has the liquid crystal alignment pattern in which the optical axis 20A of the liquid crystal compound 20 changes while continuously rotating counterclockwise in the arrow Xa direction.

The liquid crystal compound 20 forming the cholesteric liquid crystal layer 120 in the example shown in the drawing is two-dimensionally arranged in the one in-plane direction (arrow Xa direction) in which the direction of the optical axis 20A continuously rotates and in a direction perpendicular to the one in-plane direction.

In the following description, the direction perpendicular to the one in-plane direction in which the optical axis 20A of the liquid crystal compound 20 in the cholesteric liquid crystal layer changes while continuously rotating will be referred to as the Y direction. Accordingly, in FIGS. 11 and 2 described below, the Y direction is a direction perpendicular to the paper plane.

In addition, the rotation direction of the optical axis of the liquid crystal compound 20 is reversed at the center of the cholesteric liquid crystal layer 120 (reflection plate) in the direction perpendicular to the Y direction.

That is, in a case where both directions perpendicular to the Y direction are represented by the X direction, the optical axis 20A of the liquid crystal compound 20 rotates counterclockwise in the Xa direction that is the left direction in the drawing with respect to the center in the X direction and in an arrow Xb direction that is the right direction in the drawing with respect to the center in the X direction.

In other words, in a case where the entire area in the arrow X direction as the direction in which the optical axis 20A of the arranged liquid crystal compound 20 rotates is assumed as a straight light toward the left (Xa direction) in the drawing, the optical axis 20A rotates clockwise from an end portion on the right side in the drawing to the center, the rotation direction is reversed at the center, and the optical axis 20A rotates counterclockwise from the center to an end portion on the right side in the drawing.

Specifically, "the direction of the optical axis 20A of the liquid crystal compound 20 changes while continuously rotating in the arrow Xa direction (the arrow Xb direction, the predetermined one in-plane direction)" represents that an angle between the optical axis 20A of the liquid crystal compound 20, which is arranged in the arrow Xa direction, and the arrow X direction varies depending on positions in the arrow X direction, and the angle between the optical axis 20A and the arrow Xa direction sequentially changes from θ to θ+180° or θ−180° in the arrow Xa direction.

A difference between the angles of the optical axes 20A of the liquid crystal compound 20 adjacent to each other in the arrow Xa direction is preferably 45° or less, more preferably 15° or less, and still more preferably less than 15°.

On the other hand, in the liquid crystal compound 20 forming the cholesteric liquid crystal layer 120, the directions of the optical axes 20A are the same in the Y direction perpendicular to the arrow Xa direction, that is, the Y direction perpendicular to the one in-plane direction in which the optical axis 20A continuously rotates.

In other words, in the liquid crystal compound 20 forming the cholesteric liquid crystal layer 120, angles between the optical axes 20A of the liquid crystal compound 20 and the arrow Xa (arrow Xb) direction are the same in the Y direction.

In the cholesteric liquid crystal layer 120, in the liquid crystal alignment pattern of the liquid crystal compound 20, the length (distance) over which the optical axis 20A of the liquid crystal compound 20 rotates by 180° in the arrow Xa direction in which the optical axis 20A changes while continuously rotating in a plane is the length Λ of the single period in the liquid crystal alignment pattern.

That is, a distance between centers of two liquid crystal compounds 20 in the arrow Xa direction is the length Λ of the single period, the two liquid crystal compounds having the same angle in the arrow Xa direction. Specifically, as shown in FIG. 12, a distance of centers in the arrow X direction of two liquid crystal compounds 20 in which the arrow X direction and the direction of the optical axis 20A match each other is the length Λ of the single period.

In the liquid crystal diffraction element 118, the length Λ of the single period is a pitch of the periodic structure in the diffraction element.

In the following description, the length Λ of the single period will also be referred to as "single period Λ".

In the liquid crystal alignment pattern of the cholesteric liquid crystal layer 120, the single period Λ is repeated in the arrow X direction (and the direction opposite to the arrow X direction), that is, in the one in-plane direction in which the direction of the optical axis 20A changes while continuously rotating.

In addition, in the cholesteric liquid crystal layer 120, the single period Λ in the one in-plane direction in which the optical axis 20A rotates gradually decreases from the inner side (center) toward the outer side.

As described above, in the cholesteric liquid crystal layer 120, the optical axis 20A rotates counterclockwise in the arrow Xa direction toward the left direction in the drawing and the arrow Xb direction toward the right direction in the drawing from the center in the arrow X direction.

Accordingly, in the cholesteric liquid crystal layer 120, the single period Λ gradually decreases in the arrow Xa direction and the arrow Xb direction. Further, the single period Λ may decrease continuously or stepwise from the center toward the outer side.

The cholesteric liquid crystal layer obtained by immobilizing a cholesteric liquid crystalline phase typically reflects incident light (circularly polarized light) by specular reflection.

On the other hand, the cholesteric liquid crystal layer 120 reflects incident light in a state where it is tilted in a direction opposite to the arrow Xa direction with respect to the specular reflection. The cholesteric liquid crystal layer 120 has the liquid crystal alignment pattern in which the optical axis 20A changes while continuously rotating counterclockwise in the arrow Xa direction in a plane (the predetermined one in-plane direction).

Hereinafter, the description will be made with reference to FIG. 13.

For example, the cholesteric liquid crystal layer 120 selectively reflects right circularly polarized light $R_R$ of red light. Accordingly, in a case where light is incident into the cholesteric liquid crystal layer 120, the cholesteric liquid crystal layer 120 reflects only right circularly polarized light $R_R$ of red light and allows transmission of the other light.

In a case where the right circularly polarized light Rx of red light incident into the cholesteric liquid crystal layer 120 is reflected from the cholesteric liquid crystal layer, the absolute phase changes depending on the directions of the optical axes 20A of the respective liquid crystal compounds 20.

Here, in the cholesteric liquid crystal layer 120, the optical axis 20A of the liquid crystal compound 20 changes while rotating in the arrow Xa direction (the one in-plane direction). Therefore, the amount of change in the absolute phase of the incident right circularly polarized light Ra of red light varies depending on the directions of the optical axes 20A.

Further, the liquid crystal alignment pattern formed in the cholesteric liquid crystal layer 120 is a pattern that is periodic in the arrow Xa direction. Therefore, as conceptually shown in FIG. 13, an absolute phase Q that is periodic in the arrow Xa direction corresponding to the direction of the optical axis 20A is assigned to the right circularly polarized light Ra of red light incident into the cholesteric liquid crystal layer 120.

In addition, the direction of the optical axis 20A of the liquid crystal compound 20 with respect to the arrow X direction is uniform in the arrangement of the liquid crystal compound 20 in the Y direction perpendicular to arrow Xa direction.

As a result, in the cholesteric liquid crystal layer 120, an equiphase surface E that is tilted in the arrow Xa direction with respect to an XY plane is formed for the right circularly polarized light Ra of red light.

Therefore, the right circularly polarized light $R_R$ of red light is reflected in the normal direction of the equiphase surface E, and the reflected right circularly polarized light R of red light is reflected in a direction that is tilted in the direction opposite to the arrow Xa direction with respect to the XY plane (main surface of the cholesteric liquid crystal layer).

Accordingly, by appropriately setting the arrow Xa direction as the one in-plane direction in which the optical axis 20A rotates counterclockwise, a direction in which the right circularly polarized light $R_R$ of red light is reflected can be adjusted.

Figure 13:
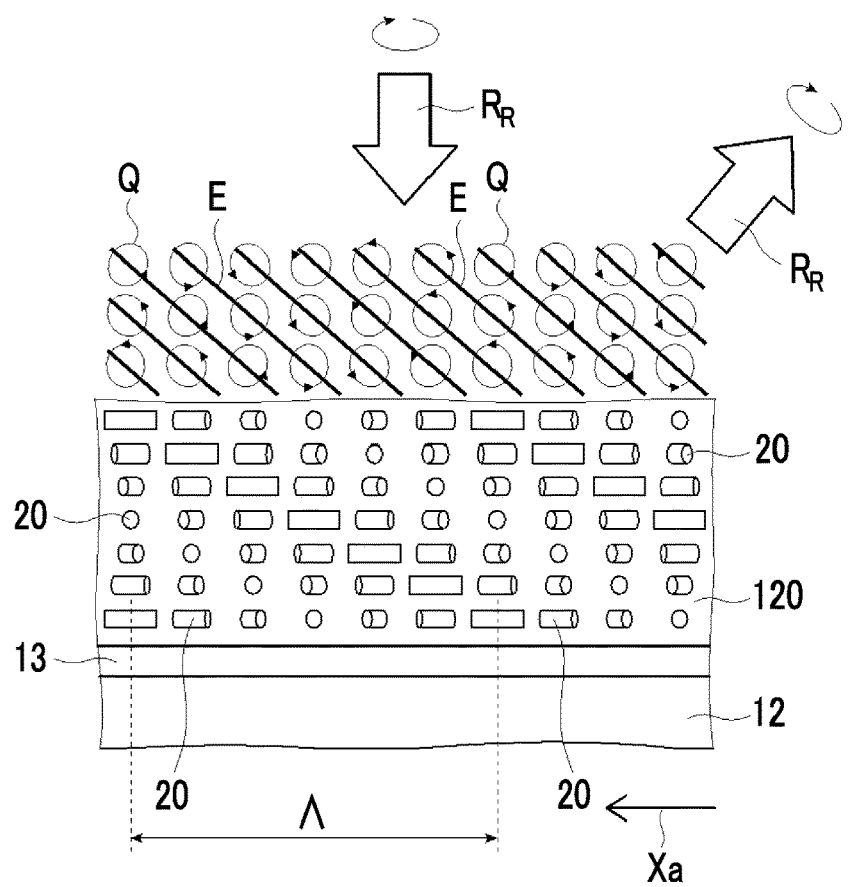
FIG. 13 is a conceptual diagram showing an action of the liquid crystal diffraction element shown in FIG. 11.

That is, in the direction (arrow Xb direction) opposite to the arrow Xa direction, the reflection direction of the right circularly polarized light Ra of red light is opposite to that of FIG. 13.

In addition, by reversing the rotation direction of the optical axis 20A of the liquid crystal compound 20 toward the arrow X direction, a reflection direction of the right circularly polarized light $R_R$ of red light can be reversed.

That is, in FIGS. 12 and 13, the rotation direction of the optical axis 20A toward the arrow Xa direction is counterclockwise, and the right circularly polarized light $R_R$ of red light is reflected in the direction opposite to the arrow Xa direction. Here, by setting the rotation direction of the optical axis 20A in the arrow Xa direction to be clockwise, the right circularly polarized light $R_R$ of red light is reflected in a state where it is tilted in the arrow Xa direction.

As described above, in the cholesteric liquid crystal layer 120, the optical axis 20A rotates counterclockwise in the arrow Xa direction toward the left side in the drawing and the arrow Xb direction toward the right side in the drawing from the center in the arrow X direction. In other words, in the entire region of the arrow X direction, the optical axis 20A rotates clockwise from the right side end portion in the drawing toward the center, the rotation direction is reversed at the center, and the optical axis 20A rotates counterclockwise from the center to the left side end portion in the drawing.

Accordingly, right circularly polarized light incident into the cholesteric liquid crystal layer 120 is diffracted and reflected to the right direction on the left side in the drawing of the arrow X direction, and is diffracted and reflected to the left direction on the right side in the same drawing.

Further, in the cholesteric liquid crystal layer having the same liquid crystal alignment pattern, the reflection direction is reversed by adjusting the helical turning direction of the liquid crystal compound 20, that is, the turning direction of circularly polarized light to be reflected.

The cholesteric liquid crystal layer 120 shown in FIG. 13 has a right-twisted helical turning direction, selectively reflects right circularly polarized light, and has the liquid crystal alignment pattern in which the optical axis 20A rotates clockwise in the arrow X direction.

As a result, the right circularly polarized light is reflected in a state where it is tilted in the arrow X direction.

Accordingly, in the cholesteric liquid crystal layer that has a left-twisted helical turning direction, selectively reflects left circularly polarized light, and has the liquid crystal alignment pattern in which the optical axis 20A rotates counterclockwise in the arrow Xa direction, the left circularly polarized light is reflected in a state where it is tilted in the arrow Xa direction.

In the cholesteric liquid crystal layer having the liquid crystal alignment pattern, as the single period Λ decreases, the diffraction angle of reflected light with respect to the above-described specular reflection of the incidence light increases. That is, as the single period Λ decreases, reflected light can be reflected in a state where it is largely tilted with respect to the specular reflection of incidence light.

As described above, in the cholesteric liquid crystal layer 120, the single period Λ gradually decreases in the arrow Xa direction toward the left side in the drawing from the center and the arrow Xb direction toward the right side in the drawing from the center. Accordingly, in the cholesteric liquid crystal layer 120, the diffraction angle of light during reflection increases in the arrow Xa direction and the arrow Xb direction.

As described above, the cholesteric liquid crystal layer having the liquid crystal alignment pattern has wavelength-selective reflectivity and reflects light having a selective wavelength while diffracting the light.

Here, in the cholesteric liquid crystal layer 120, the optical axis 20A rotates counterclockwise in the arrow Xa direction toward the left side in the drawing and the arrow Xb direction toward the right side in the drawing from the center in the arrow X direction. As a result, right circularly polarized light incident into the cholesteric liquid crystal layer 120 is diffracted and reflected to the right direction on the left side in the drawing of the arrow X direction, and is diffracted and reflected to the left direction on the right side in the same drawing.

In addition, in the cholesteric liquid crystal layer 120, the single period Λ gradually decreases in the arrow Xa direction and the arrow Xb direction. Accordingly, in the cholesteric liquid crystal layer 120, the diffraction angle of light during reflection gradually increases in the arrow Xa direction and the arrow Xb direction.

Therefore, the right circularly polarized light of red light incident into the cholesteric liquid crystal layer 120 (liquid crystal diffraction element) is reflected to be collected toward the center in the arrow X direction, that is, in the one in-plane direction in which the optical axis 20A rotates.

Accordingly, by using the reflective liquid crystal diffraction element 118 including the cholesteric liquid crystal layer 120 as the reflection plate of the light deflection element 101, incident light (light beam) can be reflected and emitted to be collected toward the center in the arrow X direction while being deflected.

Here, the cholesteric liquid crystal layer 120 shown in FIG. 11 has the configuration in which the optical axis of the liquid crystal compound is parallel to the main surface of the cholesteric liquid crystal layer, but the present invention is not limited thereto.

Figure 14:
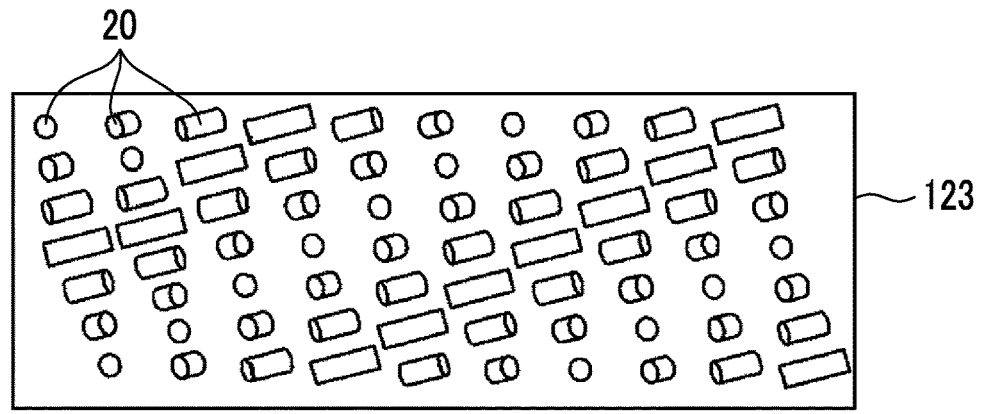
FIG. 14 is a conceptual diagram showing another example of the reflective liquid crystal diffraction element.

For example, as in a cholesteric liquid crystal layer 123 shown in FIG. 14, in the above-described cholesteric liquid crystal layer, the optical axis of the liquid crystal compound may be tilted to the main surface of the liquid crystal layer (cholesteric liquid crystal layer). The cholesteric liquid crystal layer 123 is the same as the cholesteric liquid crystal layer 120 in that they have the liquid crystal alignment pattern in which the direction of the optical axis derived from the liquid crystal compound changes while continuously rotating in the one in-plane direction. That is, the plan view of the cholesteric liquid crystal layer 123 is the same as that of FIG. 12.

In the following description, the configuration in which the optical axis of the liquid crystal compound is tilted with respect to the main surface of the cholesteric liquid crystal layer also has a pretilt angle.

The cholesteric liquid crystal layer may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

In a case where the cholesteric liquid crystal layer has the pretilt angle on the surface, the cholesteric liquid crystal layer further has a tilt angle due to the influence of the surface even in a bulk portion distant from the surface. The liquid crystal compound has the pretilt angle (is tilted). As a result, in a case where light is diffracted, the effective birefringence index of the liquid crystal compound increases, and the diffraction efficiency can be improved.

The pretilt angle can be measured by cutting the liquid crystal layer with a microtome and observing a cross-section with a polarization microscope.

In the present invention, light that is vertically incident into the cholesteric liquid crystal layer travels obliquely in an oblique direction in the cholesteric liquid crystal layer along with a bending force. In a case where light travels in the cholesteric liquid crystal layer, diffraction loss is generated due to a deviation from conditions such as a diffraction period that are set to obtain a desired diffraction angle originally with respect to the vertically incident light.

In a case where the liquid crystal compound is tilted, an orientation in which a higher birefringence index is generated with respect to an orientation in which light is diffracted is present as compared to a case where the liquid crystal compound is not tilted. In this direction, the effective extraordinary light refractive index increases, and thus the birefringence index as a difference between the extraordinary light refractive index and the ordinary light refractive index increases.

By setting the orientation of the pretilt angle according to the desired diffraction orientation, a deviation from the original diffraction conditions in the orientation can be suppressed. As a result, it is presumed that, in a case where the liquid crystal compound having a pretilt angle is used, a higher diffraction efficiency can be obtained.

The pretilt angle is in a range of 0° to 90°. However, in a case where the pretilt angle is excessively large, the birefringence index on the front decreases. Therefore, the pretilt angle is preferably about 1° to 30°. The pretilt angle is more preferably 3° to 20° and still more preferably 5° to 15°.

In addition, it is desirable that the pretilt angle is controlled by treating the interface of the liquid crystal layer.

By pretilting the alignment film on the support side interface, the pretilt angle of the liquid crystal compound can be controlled. For example, by obliquely exposing the alignment film 13 to ultraviolet light after exposure from the front during the formation of the alignment film 13, the liquid crystal compound in the cholesteric liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired orientation in a case where light is diffracted in the direction.

Further, an additive for promoting the pretilt angle can also be added to the cholesteric liquid crystal layer or to the alignment film. In this case, the additive can be used as a factor for further improving the diffraction efficiency.

This additive can also be used for controlling the pretilt angle on the air side interface.

The optical axis 20A of the liquid crystal compound 20 in the liquid crystal alignment pattern of the cholesteric liquid crystal layer shown in FIG. 12 continuously rotates only in the arrow X direction.

However, the present invention is not limited thereto, and various configurations can be used as long as the optical axis 20A of the liquid crystal compound 20 in the cholesteric liquid crystal layer continuously rotates at least in the one in-plane direction.

Figure 15:
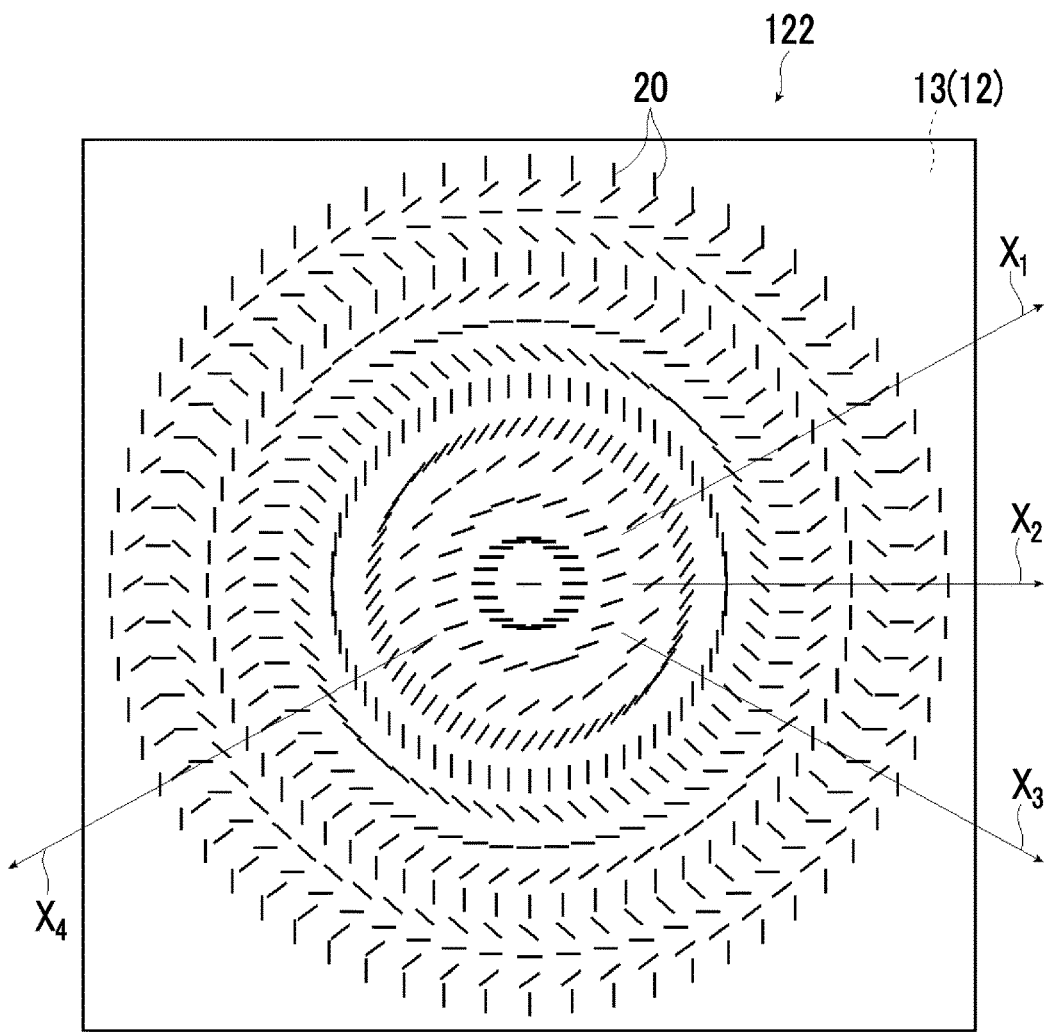
FIG. 15 is a schematic plan view showing the liquid crystal diffraction element shown in FIG. 11.

As a preferable example, as conceptually shown in a plan view of FIG. 15, a cholesteric liquid crystal layer 122 having a liquid crystal alignment pattern in a radial shape from an inner side (center) toward an outer side can be adopted, the liquid crystal alignment pattern being a pattern in which the direction of the optical axis 20A derived from the liquid crystal compound 20 changes while continuously rotating in the one in-plane direction, That is, the liquid crystal alignment pattern in the cholesteric liquid crystal layer 122 shown in FIG. 15 is a concentric circular pattern having a concentric circular shape where the one in-plane direction in which the direction of the optical axis 20A derived from the liquid crystal compound 20 changes while continuously rotating moves from an inner side toward an outer side.

FIG. 15 shows only the liquid crystal compound 20 of the surface of the alignment film as in FIG. 12. However, as in the example shown in FIG. 11, the cholesteric liquid crystal layer 122 has the helical structure in which the liquid crystal compound 20 on the surface of the alignment film is helically turned and laminated as described above.

In the cholesteric liquid crystal layer 122, the direction of the optical axis of the liquid crystal compound 20 changes while continuously rotating in a direction in which a large number of optical axes move to the outer side from the center of the cholesteric liquid crystal layer 122, for example, a direction indicated by the arrow $X_1$, a direction indicated by an arrow $X_2$, a direction indicated by an arrow $X_1$, a direction indicated by an arrow $X_4$, or ..., Accordingly, in the cholesteric liquid crystal layer 122, the rotation direction of the optical axis of the liquid crystal compound 20 is the same in all the directions (one in-plane directions). In the example shown in the drawing, in all the directions including the direction indicated by the arrow $X_1$, the direction indicated by the arrow $X_2$, the direction indicated by the arrow $X_3$, and the direction indicated by the arrow $X_4$, the rotation direction of the optical axis of the liquid crystal compound 20 is counterclockwise.

That is, in a case where the arrow $X_1$ and the arrow $X_4$ are assumed as one straight line, the rotation direction of the optical axis of the liquid crystal compound 20 at the center of the cholesteric liquid crystal layer 122 is reversed on the straight line. For example, the straight line formed by the arrow $X_1$ and the arrow $X_4$ is directed in the right direction (arrow $X_1$ direction) in the drawing. In this case, the optical axis of the liquid crystal compound 20 rotates clockwise to the center from the outer direction of the cholesteric liquid crystal layer 122, the rotation direction is reversed at the center of the cholesteric liquid crystal layer 122, and then the optical axis of the liquid crystal compound 20 rotates counterclockwise from the center of the cholesteric liquid crystal layer 122 to the outer direction thereof.

In addition, the single period Λ of the liquid crystal alignment pattern gradually decreases from the inner side (center) toward the outer side in the direction of each of the arrows. That is, the single period Λ of the liquid crystal alignment pattern gradually decreases in the direction of each of the arrows.

In the cholesteric liquid crystal layer 122 in the example shown in the drawing, the optical axis 20A of the liquid crystal compound 20 rotates counterclockwise in the direction of each of the arrows and, for example, right circularly polarized light (red right circularly polarized light) is reflected in a state where it is tilted in a direction opposite to the direction of the arrow.

The reflection direction of the circularly polarized light is reversed by reversing the rotation direction of the optical axis 20A toward the direction of the arrow. For example, in the example shown in the drawing, right circularly polarized light is reflected in a state where it is tilted in the direction of each of the arrows by setting the rotation direction of the optical axis 20A of the liquid crystal compound 20 in the direction of each of the arrows to be clockwise.

Further, the reflection direction of the circularly polarized light is reversed by reversing the turning direction of the circularly polarized light. For example, in the example shown in the drawing, in the cholesteric liquid crystal layer in which left circularly polarized light is selectively reflected by reversing the helical rotation direction of the cholesterically aligned liquid crystal compound, left circularly polarized light is reflected in a state where it is tilted in the direction of the arrow.

Accordingly, as shown in FIG. 15, in the cholesteric liquid crystal layer 122 having the concentric circular liquid crystal alignment pattern, that is, the liquid crystal alignment pattern in which the optical axis changes while continuously rotating in a radial shape, incidence light can be reflected as diverging light or converging light depending on the rotation direction of the optical axis of the liquid crystal compound 20 and the direction of circularly polarized light to be reflected.

That is, by setting the liquid crystal alignment pattern of the cholesteric liquid crystal layer to be concentric circular, the reflective liquid crystal diffraction element exhibits a function of a concave mirror or a convex mirror depending on the circularly polarized light that is selectively reflected and the rotation direction of the optical axis 20A of the liquid crystal compound 20 toward the one in-plane direction.

Further in the example shown in the drawing, in a preferable aspect, the length of the single period Λ over which the optical axis rotates by 180° in the liquid crystal alignment pattern gradually decreases in the direction of the arrow, that is, from the center of the cholesteric liquid crystal layer toward the outer direction in the one in-plane direction in which the optical axis continuously rotates.

As described above, in the cholesteric liquid crystal layer having the liquid crystal alignment pattern in which the optical axis rotates in the one in-plane direction, the diffraction angle of light that is reflected, that is, the reflection angle of reflected light with respect to the specular reflection increases as the single period Λ in the liquid crystal alignment pattern decreases. Accordingly, the length of the single period Λ in the liquid crystal alignment pattern gradually decreases from the center of the cholesteric liquid crystal layer toward the outer direction in the one in-plane direction in which the optical axis continuously rotates. As a result, light can be further collected, and the performance as a concave mirror can be improved.

That is, by using the reflective liquid crystal diffraction element including the cholesteric liquid crystal layer 122 having the concentric circular liquid crystal alignment pattern as the reflection plate of the light deflection element 101 (MEMS light deflection element 101), incidence light (light beam) can be collected in the entire region in the peripheral direction, and the collected light can be reflected and emitted.

Accordingly, by using the reflective liquid crystal diffraction element including the cholesteric liquid crystal layer 122 having the concentric circular liquid crystal alignment pattern, the light collecting action of the reflection plate in the light deflection element 101 where the reflection plate has the light collecting function can be exhibited more suitably, and light emitted from the light deflection device 100 (liquid crystal diffraction element 121) can be converted into more suitable parallel light to improve straightness. As a result, the scanning of light using the light deflection device 100 can be more accurately performed even in a case where an object to be scanned with light is distant from the light deflection device 100.

[λ/4 Plate]

As described above, both of the reflective liquid crystal diffraction element that is used as the reflection plate of the light deflection element 101 and the transmissive liquid crystal diffraction element 121 that is used as the angle increasing optical element exhibits an optical action mainly with respect to the circularly polarized light (circularly polarized light component) such that light is diffracted.

Accordingly, in the light deflection device 100 according to the embodiment of the present invention, it is preferable to dispose a λ/4 plate upstream of the light deflection element 101 in the light traveling direction. In particular, in a case where light that is deflected by the light deflection device 100 is linearly polarized light, that is, in a case where light that is emitted from a light source (not shown) to the light deflection element 101 is linearly polarized light, the λ/4 plate is suitably used.

The λ/4 plate is a well-known λ/4 plate (¼ phase difference plate) that converts linearly polarized light into circularly polarized light.

As the λ/4 plate, a well-known λ/4 plate can be used without any particular limitation. Accordingly, the λ/4 plate may be derived from a polymer or may be derived from liquid crystal.

In the light deflection device 100 shown in FIG. 1, linearly polarized light emitted from a light source (not shown) is converted into, for example, right circularly polarized light by the λ4 plate (not shown).

In the light deflection device 100 that includes the light deflection element 101 including the reflective liquid crystal diffraction element, the λ/4 plate may be disposed between the light deflection element 101 and the liquid crystal diffraction element 121. However, from the viewpoints that, for example, the size of the λ/4 plate can be reduced and incidence light can be efficiently deflected by the light deflection element 101, in the light deflection device 100 including the light deflection element 101, it is preferable that the λ/4 plate is provided upstream of the light deflection element 101.

In addition, in the light deflection device 100 that includes the light deflection element 101 including the reflective liquid crystal diffraction element, in a case where circularly polarized light is incident, the λ/4 plate does not need to be provided.

The right circularly polarized light that is converted by the λ/4 plate is collected and deflected by the light deflection element 101 that selectively diffracts and reflects right circularly polarized light and includes the reflective liquid crystal diffraction element.

The right circularly polarized light that is collected and deflected by the light deflection element 101 is incident into the above-described transmissive liquid crystal diffraction element 121 where the rotation direction and the like of the optical axis 20A of the liquid crystal compound 20 is set the right circularly polarized light is diffracted (refracted) toward the outer side in the deflection direction. The right circularly polarized light incident into the liquid crystal diffraction element 121 is converted into left circularly polarized light by the liquid crystal diffraction element 121, and the left circularly polarized light is further diffracted toward the outer side in the deflection direction by the light deflection element 101.

As a result, the deflection angle of the left circularly polarized light increases as described above, and the straight light is emitted from the light deflection device 100 at a desired maximum emission angle θmaxout that is more than a maximum deflection angle θmax of the light deflection element 101.

In addition, the right circularly polarized light that is incident into the liquid crystal diffraction element 121 is collected by the light deflection element 101. Therefore, the left circularly polarized light that is further diffracted/deflected by the liquid crystal diffraction element 121 is suitable parallel light, which is light having satisfactory straightness that can be accurately scanned even from a region far from the light deflection device 100.

In the light deflection device 100 according to the embodiment of the present invention, in a case where the liquid crystal diffraction element shown in FIG. 3 where the direction in which the optical axis 20A derived from the liquid crystal compound 20 rotates and changes is the one in-plane direction is used as the transmissive liquid crystal diffraction element 121 as the angle increasing optical element where the deflection of light by the light deflection element 101 is one-dimensional, the deflection direction of light by the light deflection element 101 and the axis A direction (arrow x direction) in the liquid crystal diffraction element 121 are matched.

In addition, in the light deflection device 100 according to the embodiment of the present invention, in a case where the deflection of light by the light deflection element 101 is radial (two-dimensional), the liquid crystal diffraction element 121 shown in FIG. 5 including the optically-anisotropic layer 14A having the concentric circular liquid crystal alignment pattern is used as the transmissive liquid crystal diffraction element 121 as the angle increasing optical element. In this case, the liquid crystal diffraction element 121 shown in FIG. 5 including the optically-anisotropic layer 14A having the concentric circular liquid crystal alignment pattern can be used even in a case where the deflection of light by the light deflection element 101 is one-dimensional.

In the present invention, in a case where the liquid crystal diffraction element functions as a concave lens, a direction of circularly polarized light to be reflected (sense of a helical structure) from the cholesteric liquid crystal layer may be reversed to be opposite to that in the case of a convex lens, that is, the helical turning direction of the cholesteric liquid crystal layer is reversed.

In this case, by gradually decreasing the length of the single period Λ over which the optical axis rotates by 180° from the center of the cholesteric liquid crystal layer 122 toward the outer direction in the one in-plane direction in which the optical axis continuously rotates, light reflected from the cholesteric liquid crystal layer can be further dispersed, and the performance as a concave lens can be improved.

In a state where the helical turning direction of the cholesteric liquid crystal layer is reversed, the continuous rotation direction of the optical axis in the liquid crystal alignment pattern is reversed from the center of the cholesteric liquid crystal layer. As a result, the liquid crystal diffraction element can be made to function as a convex lens.

In the present invention, in a case where the liquid crystal diffraction element is made to function as a convex lens or a concave lens, it is preferable that the liquid crystal diffraction element satisfies the following expression.

$$\Phi(r)=(\pi/\lambda)[(r^2+f^2)^{1/2}-f]$$

Here, r represents a distance from the center of a concentric circle and is represented by Expression "$r=(x^2+y^2)^{1/2}$". x and y represent in-plane positions, and (x,y)=(0,0) represents the center of the concentric circle. $\Phi(r)$ represents an angle of the optical axis at the distance r from the center, $\lambda$ represents the selective reflection center wavelength of the cholesteric liquid crystal layer, and f represents a desired focal length.

In the present invention, depending on the uses of the liquid crystal diffraction element, conversely, the length of the single period $\Lambda$ in the concentric circular liquid crystal alignment pattern may gradually increase from the center of the cholesteric liquid crystal layer toward the outer direction in the one in-plane direction in which the optical axis continuously rotates.

Further, depending on the uses of the liquid crystal diffraction element such as a case where it is desired to provide a light amount distribution in transmitted light, a configuration in which regions having partially different lengths of the single periods $\Lambda$ in the one in-plane direction in which the optical axis continuously rotates are provided can also be used instead of the configuration in which the length of the single period $\Lambda$ gradually changes in the one in-plane direction in which the optical axis continuously rotates.

The light deflection device according to the embodiment of the present invention can realize a high-performance light deflection device having a small and simple configuration using a simple driving method.

The light deflection device according to the embodiment of the present invention can be used in various optical devices.

Figure 10:
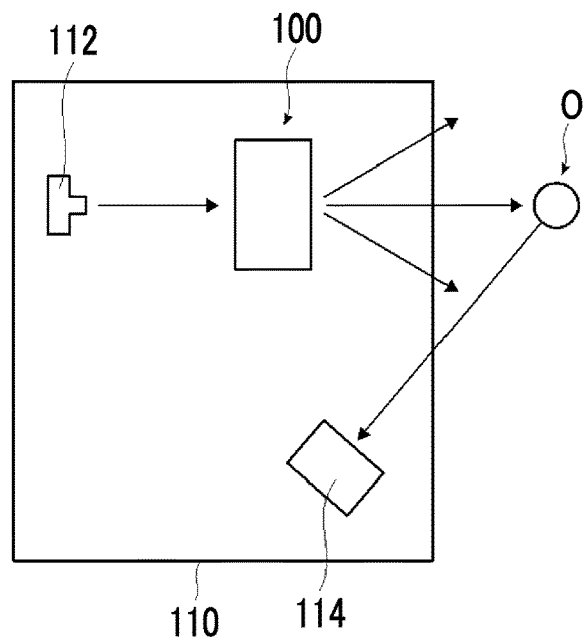
FIG. 10 is a conceptual diagram showing an example of an optical device according to the present invention.

FIG. 10 conceptually shows an example of an optical device according to the embodiment of the present invention including the light deflection device according to the embodiment of the present invention.

An optical device 110 shown in FIG. 10 includes a light source 112, the light deflection device 100 according to the embodiment of the present invention, and a light-receiving element 114.

In the optical device 110, light emitted from the light source 112 is deflected by the light deflection device 100 according to the embodiment of the present invention. The deflected light is emitted from the optical device 110 and reflected from a measurement target O. The reflected light from the measurement target O is incident again into the optical device 110, is received by the light-receiving element 114, and is measured.

The optical device 110 according to the embodiment of the present invention is used as various sensors. As the sensor used in the optical device 110, for example, a distance-measuring sensor using so-called LiDAR, a shape measuring sensor, or a recognition sensor.

In the optical device 110, the light source 112 is not particularly limited, and an appropriate light source may be selected depending on the measurement target, the use of the optical device 110, and the like. Examples of the light source 112 include a semiconductor laser, a laser diode (LD), and a light emitting diode (LED). For example, in a case where the optical device 110 is used as a distance-measuring sensor, for example, a light source that emits infrared light is preferably used as the light source 112. In addition, depending on targets to be measured and environments, for example, a light source that emits light having a wavelength other than infrared light or an electromagnetic wave can also be preferably used. For example, a laser light source that emits visible light may also be used.

The light-receiving element 114 is not particularly limited, and various well-known light-receiving elements can be used as long as they can measure light emitted from the light source 112. Examples of the light-receiving element 114 include a charge coupled device (CCD) sensor and a photomultiplier.

In addition, the light deflection device according to the embodiment of the present invention has a simple structure, can be easily driven, and can deflect light at a large angle. Therefore, the light deflection device according to the embodiment of the present invention can be used for various uses where a reduction in weight and size is desired and light is scanned. Examples of the uses of the light deflection device according to the embodiment of the present invention include a drawing device using beam scanning, a beam scanning projection display, a beam scanning head-up display, and beam scanning AR glasses. In this case, the light deflection device according to the embodiment of the present invention can be used as a device that deflects light in a wide wavelength range including visible light.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Preparation of MEMS Light Deflection Element>
A micromirror device was prepared using a method described in JP2014-134642A. The diameter of the reflection plate was 1 mm, the angle of deflection by movement of the reflection plate was ±35°.

Next, a reflective liquid crystal diffraction element for bonding to the mirror of the micromirror device was prepared as follows.
<Preparation of Reflective Liquid Crystal Diffraction Element for MEMS Light Deflection Element>
(Formation of Alignment Film)

A glass substrate was used as the support. The following coating liquid for forming an alignment film was applied to the support using a spin coater at 2500 rpm for 30 seconds. The support on which the coating film of the coating liquid for forming an alignment film was formed was dried using a hot plate at 60° C. for 60 seconds. As a result, an alignment film was formed.

Coating Solution For Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethylether | 42.00 parts by mass |

—Material for Photo-Alignment—

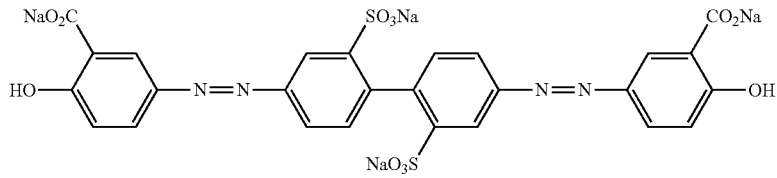

(Exposure of Alignment Film)

The alignment film was exposed using the exposure device shown in FIG. 7 to form an alignment film P-1 having an alignment pattern.

In the exposure device, a laser that emits laser light having a wavelength (325 nm) was used as the laser. The exposure dose of the interference light was 100 mJ/cm².

By adjusting the refractive power of the lens (convex lens), during the subsequent formation of the optically-anisotropic layer, the rotation period of the optical axis of the liquid crystal compound in the optically-anisotropic layer was set to gradually decrease from the center toward the outer side. The obtained value of the rotation period is described below.

(Formation of Cholesteric Liquid Crystal Layer)

As the liquid crystal composition forming the first cholesteric liquid crystal layer, the following composition LC-1 was prepared.

Composition LC-1

The above-described liquid crystal composition IC-1 was applied to the patterned alignment film P-1 using a spin coater at 800 rpm for 10 seconds. The coating film of the liquid crystal composition LC-1 was heated on a hot plate at 80° C. for 3 minutes (180 sec). Next, the coating film was irradiated with ultraviolet light having a wavelength of 365 nm at 80° C. at an irradiation dose of 300 mJ/cm using a high-pressure mercury lamp in a nitrogen atmosphere. As a result, the liquid crystal composition LC-1 was cured, the alignment of the liquid crystal compound was immobilized, and a cholesteric liquid crystal layer was formed.

It was verified using a polarization microscope that the cholesteric liquid crystal layer had a periodically aligned surface as shown in FIG. 15.

The cholesteric liquid crystal layer was cut in a direction along the rotation direction of the optical axis, and a cross-section was observed with a SEM. As a result, it was verified that bright portions and dark portions observed on a SEM cross-section were tilted with respect to the main

| | |
|---|---|
| Rod-like liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 1.91 parts by mass |
| Methyl ethyl ketone | 330.60 parts by mass |

Liquid Crystal Compound L-1

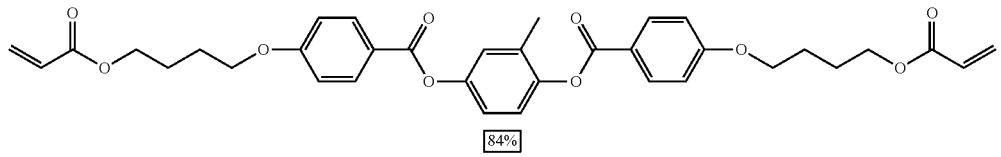 [SMILES: C=CC(=O)OCCCCOc1ccc(C(=O)Oc2ccc(OC(=O)c3ccc(OCCCCOC(=O)C=C)cc3)c(C)c2)cc1]

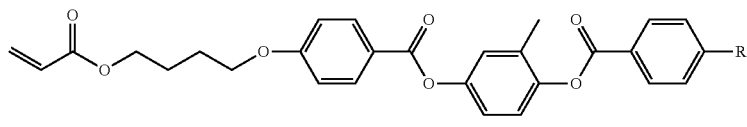

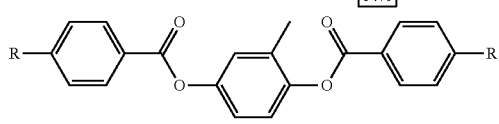

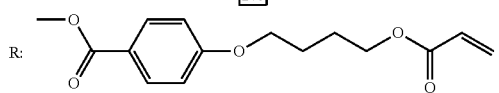

Chiral Agent Ch-1

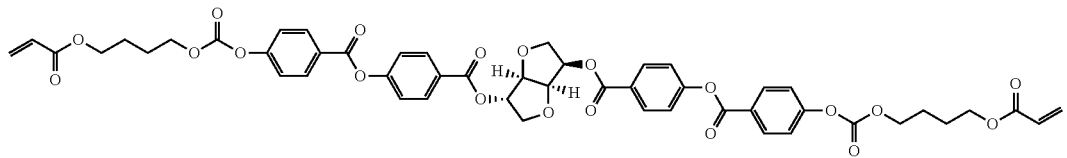 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

surface. The bright portions and the dark portions were derived from a cholesteric liquid crystalline phase and observed, and a structure in which the bright portion and the dark portion are repeated twice corresponds to one helical pitch. The bright portions and the dark portions are formed to connect the liquid crystal compounds in which the directions of the optical axes match each other in the turning direction. That is, the bright portions and the dark portions match with the above-described equiphase surface.

The diameter of the reflective liquid crystal diffraction element was 1 mm. In the liquid crystal alignment pattern of the optically-anisotropic layer, regarding the single period (single period Λ) over which the optical axis of the liquid crystal compound rotated by 180°, the single period of a center portion was significantly large (the inverse of the rotation period was 0), the single period of a portion at a distance of 0.25 mm from the center was 150 m, and the single period of a portion at a distance of 0.5 mm from the center was 75 µm. This way, the single period gradually decreased from the center toward the outer direction.

The reflective liquid crystal diffraction element prepared as described above was bonded to the mirror of the micromirror device using a photocurable adhesive. As a result, a MEMS light deflection element was prepared.

<Preparation of Liquid Crystal Diffraction Element for Angle Increasing Optical Element>

As conceptually shown in FIG. 8, a liquid crystal diffraction element including two optically-anisotropic layers of a first optically-anisotropic layer and a second optically-anisotropic layer was prepared.

The first optically-anisotropic layer and the second optically-anisotropic layer are layers where the liquid crystal compound is twisted and aligned, and are tilted optically-anisotropic layers in which, in a cross-sectional SEM image obtained by observing a cross-section of the liquid crystal diffraction element with a SEM, bright and dark lines derived from the twisted alignment of the liquid crystal compound were tilted with respect to the normal line of an interface between the first optically-anisotropic layer and the second optically-anisotropic layer as shown in FIG. 8.

Further, the twisted direction in the twisted alignment of the liquid crystal compound of the first optically-anisotropic layer was different from that of the second optically-anisotropic layer. As a result, the tilt directions of the bright and dark lines derived from the twisted alignment in the cross-sectional SEM images were different from each other.

In the following description, "the bright and dark lines derived from the twisted alignment" will also be simply referred to as "bright and dark lines". In addition, "the normal line of the interface between the first optically-anisotropic layer and the second optically-anisotropic layer" will also be simply referred to as "normal line", (Formation of First Optically-Anisotropic Layer)

As the liquid crystal composition forming the first optically-anisotropic layer, the following composition A-5 was prepared.

Composition 5

| | |
|---|---|
| Liquid crystal compound L-1 | 100.00 parts by mass |
| Chiral agent A | 0.13 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2840.00 parts by mass |

Chiral Agent A

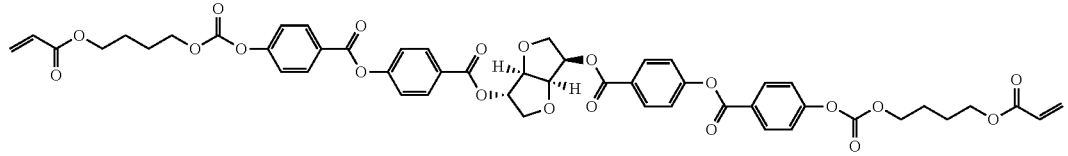 [SMILES: C=CC(=O)OCCCCOC(=O)Oc1ccc(C(=O)Oc2ccc(C(=O)O[C@H]3CO[C@H]4[C@@H]3OC[C@H]4OC(=O)c3ccc(OC(=O)c4ccc(OC(=O)OCCCCOC(=O)C=C)cc4)cc3)cc2)cc1]

An alignment film P-1 was formed using the same method as that of the reflective liquid crystal diffraction element, except that the composition A-5 was used, and a first optically-anisotropic layer was formed.

(Formation of Second Optically-Anisotropic Layer)

As the liquid crystal composition forming the second optically-anisotropic layer, the following composition A-6 was prepared.

Composition A-6

| | |
|---|---|
| Liquid crystal compound L-1 | 100.00 parts by mass |
| Chiral agent B | 0.22 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2840.00 parts by mass |

Chiral Agent B

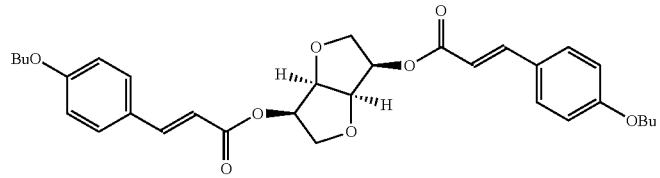

A second optically-anisotropic layer was formed on the first optically-anisotropic layer using the same method as that of the first optically-anisotropic layer, except that the composition A-6 was used. As a result, a liquid crystal diffraction element including two optically-anisotropic layers as shown in FIG. 8 was prepared.

In the first optically-anisotropic layer and the second optically-anisotropic layer of the prepared liquid crystal diffraction element, finally, $\Delta n_{940} \times$Thickness (=Re(940)) of the liquid crystal was 470 nm, and a periodic liquid crystal alignment pattern having a concentric circular shape as shown in FIG. 5 was provided. Further, it was verified with a polarization microscope that the rotation period of the optical axis of the liquid crystal compound gradually decreased from the center toward the outer side in the one in-plane direction in which the optical axis rotated and that the rotation direction of the optical axis was reversed at the center.

In the liquid crystal alignment pattern of the first optically-anisotropic layer, regarding the rotation period (single period) over which the optical axis of the liquid crystal compound rotated by 180°, the rotation period of a center portion was significantly large (the inverse of the rotation period was considered 0), the rotation period of a portion at a distance of 1.0 mm from the center was 9.0 µm, the rotation period of a portion at a distance of 2.5 mm from the center was 4.5 µm, and the rotation period of a portion at a distance of 4.0 mm from the center was 3.0 µm. This way, the rotation period gradually decreased from the center toward the outer direction.

Further, the twisted direction in the liquid crystal compound of the first optically-anisotropic layer was opposite to that of the second optically-anisotropic layer. The twisted angle of the first optically-anisotropic layer in the thickness direction was 80° of the right twisting. On the other hand, the twisted angle in the thickness direction of the second optically-anisotropic layer was 80° of the left twisting.

In the cross-sectional SEM image of the liquid crystal diffraction element, in the first optically-anisotropic layer and the second optically-anisotropic layer, bright and dark lines obliquely tilted with respect to the normal line were observed. In addition, the tilt direction of the bright and dark lines of the first optically-anisotropic layer with respect to the normal line was opposite to that of the second optically-anisotropic layer. As described above, the normal line was the normal line of the interface between the first optically-anisotropic layer and the second optically-anisotropic layer.

In the first optically-anisotropic layer and the second optically-anisotropic layer, the tilt angle of the bright and dark lines with respect to the normal line gradually decreased from the center toward the outer side. Further in the pattern of the bright and dark lines of the first optically-anisotropic layer and the second optically-anisotropic layer, a state where the period decreased from the center toward the outer side was observed.

The diameter of the liquid crystal diffraction element was 10 mm. In the liquid crystal alignment pattern of the liquid crystal diffraction element, the rotation period of a center portion was significantly large (the inverse of the rotation period was 0), the rotation period at a position of a radius of 2.5 mm was 4.6 µm, and the rotation period at a position of a radius of 5 mm was 2.5 µm. This way, the rotation period gradually decreased from the center toward the outer direction.

<Assembly of Light Deflection Device>

The λ/4 plate (manufactured by Sigmakoki Co., Ltd.), the MEMS light deflection element, and the angle increasing optical element were disposed in this order from the front, and the light deflection device shown in FIG. 1 was prepared.

In this case, the polarization orientation of emitted light of the liquid crystal optical phase modulation element and the in-plane slow axis of the λ/4 plate were disposed to intersect at 45° such that the light was converted into circularly polarized light. In addition, the center of the deflection orientation of the liquid crystal optical phase modulation element and the center of the liquid crystal diffraction element were matched to each other, and the elements were bonded to each other such that the amplification effect of the deflection angle of light was able to be maximized.

In addition, as a light source, an infrared laser (wavelength: 940 nm; linearly polarized light; the orientation of the polarizing axis was extraordinary light orientation of liquid crystal, beam diameter: 1 mm) was prepared. The infrared laser was disposed such that linearly polarized light to be emitted was P polarized light with respect to the emission surface of the liquid crystal diffraction element. In addition, the distance between the micromirror device and the liquid crystal diffraction element was 7 mm.

[Evaluation]

Regarding the light deflection device according to Example 1, the angle of emitted light of infrared laser light was checked.

As a result, the deflection angle of the light deflection element was largely increased to about ±55° from the incidence angle range of −35° to +35°, and straight light where the spread of the angle of emitted light was suppressed was able to be verified.

As described above, it was verified that the present invention can exhibit an effect of obtaining a light deflection device having a simple structure suitable for reducing the size and weight where a deflection angle can be increased.

EXPLANATION OF REFERENCES

12: support
13: alignment film
14, 14A: optically-anisotropic layer
20: liquid crystal compound
20A: optical axis
50, 80: exposure device 52, 82: laser
54, 84: light source
56: polarization beam splitter
58A, 58B, 90A, 90B: mirror
60A, 60B, 96, 111: λ/4 plate
70: laser light
72A, 72B: beam
86, 94: polarization beam splitter
92: lens
100: light deflection device
101, 101A: (MEMS) light deflection element
110: optical device
112: light source
114: light-receiving element
118, 121, 121A, 220: liquid crystal diffraction element
120, 122, 123: cholesteric liquid crystal layer
141: drive unit
215: first optically-anisotropic layer
216: second optically-anisotropic layer
O: measurement target
$L_1$, $L_{41}$: incidence light
$L_2$, $L_{42}$, $L_{43}$: emitted light
$P_O$: linearly polarized light
$P_R$: right circularly polarized light
$P_L$: left circularly polarized light
M: laser light
MP: P polarized light
MS: S polarized light

What is claimed is:

1. A light deflection device comprising:
a MEMS light deflection element that comprises a reflection plate and a drive mechanism for the reflection plate and drives the reflection plate by the drive mechanism, whereby incident light is one-dimensionally or two-dimensionally deflected by the reflection plate to be emitted; and
an angle increasing optical element that is disposed downstream of the MEMS light deflection element in a light traveling direction and increases an angle range of a deflection angle of the light emitted from the MEMS light deflection element,
wherein the reflection plate of the MEMS light deflection element has a function of collecting and emitting the incident light,
the angle increasing optical element includes a diffraction element having different periodic structure pitches in a plane,
the diffraction element in the angle increasing optical element is a liquid crystal diffraction element,
the liquid crystal diffraction element includes an optically-anisotropic layer formed of a composition including a liquid crystal compound, the optically-anisotropic layer has a liquid crystal alignment pattern in which a direction of an optical axis derived from the liquid crystal compound changes while continuously rotating in at least one direction, and in a case where, in the liquid crystal alignment pattern, a length over which the direction of the optical axis derived from the liquid crystal compound rotates by 180° in the one direction in which the direction of the optical axis derived from the liquid crystal compound changes while continuously rotating is set as a single period, a length of the single period gradually decreases from an inner side toward an outer side, and
the optically-anisotropic layer has a liquid crystal alignment pattern in a radial shape from an inner side toward an outer side, the liquid crystal alignment pattern being a pattern in which the direction of the optical axis derived from the liquid crystal compound changes while continuously rotating in the one direction.

2. The light deflection device according to claim 1, wherein the MEMS light deflection element includes an other diffraction element having different periodic structure pitches in a plane.

3. The light deflection device according to claim 2, wherein the other diffraction element in the MEMS light deflection element is a diffraction element in which the periodic structure pitch gradually changes from an inner side toward an outer side in a light deflection direction of the MEMS light deflection element.

4. The light deflection device according to claim 3, wherein the other diffraction element in the MEMS light deflection element is a liquid crystal diffraction element.

5. The light deflection device according to claim 4, wherein the liquid crystal diffraction element of the other diffraction element includes a cholesteric liquid crystal layer,
the cholesteric liquid crystal layer has a liquid crystal alignment pattern in which a direction of an optical axis derived from a liquid crystal compound changes while continuously rotating in at least one direction, and
in a case where, in the liquid crystal alignment pattern, a length over which the direction of the optical axis derived from the liquid crystal compound rotates by 180° in the one direction in which the direction of the optical axis derived from the liquid crystal compound changes while continuously rotating is set as a single period, a length of the single period gradually decreases from an inner side toward an outer side.

6. The light deflection device according to claim 5, wherein the cholesteric liquid crystal layer has a liquid crystal alignment pattern in a radial shape from an inner side toward an outer side, the liquid crystal alignment pattern being a pattern in which the direction of the optical axis derived from the liquid crystal compound changes while continuously rotating in the one direction.

7. The light deflection device according to claim 2, wherein the other diffraction element in the MEMS light deflection element is a liquid crystal diffraction element.

8. The light deflection device according to claim 7, wherein the liquid crystal diffraction element of the other diffraction element includes a cholesteric liquid crystal layer,
the cholesteric liquid crystal layer has a liquid crystal alignment pattern in which a direction of an optical axis derived from a liquid crystal compound changes while continuously rotating in at least one direction, and
in a case where, in the liquid crystal alignment pattern, a length over which the direction of the optical axis derived from the liquid crystal compound rotates by 180° in the one direction in which the direction of the optical axis derived from the liquid crystal compound changes while continuously rotating is set as a single period, a length of the single period gradually decreases from an inner side toward an outer side.

9. The light deflection device according to claim 8, wherein the cholesteric liquid crystal layer has a liquid crystal alignment pattern in a radial shape from an inner side toward an outer side, the liquid crystal alignment pattern being a pattern in which the direction of the optical axis derived from the liquid crystal compound changes while continuously rotating in the one direction.

10. The light deflection device according to claim 2, wherein the diffraction element in the angle increasing optical element is a diffraction element in which the periodic structure pitch gradually changes from an inner side toward an outer side in a light deflection direction of the MEMS light deflection element.

11. The light deflection device according to claim 1, wherein the diffraction element in the angle increasing optical element is a diffraction element in which the periodic structure pitch gradually changes from an inner side toward an outer side in a light deflection direction of the MEMS light deflection element.

12. An optical device comprising:
the light deflection device according to claim 1;
a light source that emits light to the MEMS light deflection element of the light deflection device; and
a light-receiving element.

13. The light deflection device according to claim 1, wherein light incident into the angle increasing optical element decreases in diameter, and the angle increasing optical element emits the light while deflecting the light into parallel light.

* * * * *